(12) United States Patent
Aso et al.

(10) Patent No.: US 8,411,658 B2
(45) Date of Patent: Apr. 2, 2013

(54) MOBILE TERMINAL AND NETWORK NODE

(75) Inventors: Keigo Aso, Kanagawa (JP); Jun Hirano, Kanagawa (JP)

(73) Assignee: Panasonic Corporation, Osaka (JP)

( * ) Notice: Subject to any disclaimer, the term of this patent is extended or adjusted under 35 U.S.C. 154(b) by 361 days.

(21) Appl. No.: 12/865,966

(22) PCT Filed: Feb. 4, 2009

(86) PCT No.: PCT/JP2009/000436
§ 371 (c)(1),
(2), (4) Date: Aug. 3, 2010

(87) PCT Pub. No.: WO2009/098876
PCT Pub. Date: Aug. 13, 2009

(65) Prior Publication Data
US 2010/0309899 A1    Dec. 9, 2010

(30) Foreign Application Priority Data

Feb. 5, 2008    (JP) .................................. 2008-025362

(51) Int. Cl.
*H04W 4/00*    (2009.01)
(52) U.S. Cl. ....................................................... 370/338
(58) Field of Classification Search .................. 370/332, 370/338, 441
See application file for complete search history.

(56) References Cited

U.S. PATENT DOCUMENTS

| | | | |
|---|---|---|---|
| 2003/0223450 A1* | 12/2003 | Bender et al. | 370/441 |
| 2005/0117546 A1* | 6/2005 | Lioy et al. | 370/332 |
| 2006/0018273 A1 | 1/2006 | Yamada et al. | |
| 2007/0225032 A1 | 9/2007 | Saito | |
| 2007/0280207 A1* | 12/2007 | Shimizu et al. | 370/353 |
| 2008/0259848 A1 | 10/2008 | Aso | |

FOREIGN PATENT DOCUMENTS

| | | |
|---|---|---|
| EP | 1 432 198 A1 | 6/2004 |
| JP | 2004-080106 | 3/2004 |
| JP | 2006-033541 | 2/2006 |
| WO | 2006/093288 | 9/2006 |
| WO | 2007/007856 | 1/2007 |

OTHER PUBLICATIONS

D. Johnson, et al., "Mobility Support in IPv6," IETF RFC 3775, Jun. 2004, pp. 1-165, p. 3, Line 21.

R. Wakikawa, et al., "Multiple Care-of Addresses Registration," IETF Internet Draft, Jul. 2007, pp. 1-40, p. 3, Line 23.

(Continued)

*Primary Examiner* — Raj Jain
(74) *Attorney, Agent, or Firm* — Seed IP Law Group PLLC

(57) ABSTRACT

Disclosed is a technique for achieving reduction in processing load caused when a mobile terminal having two or more interfaces registers flow control information with a network and reduction in traffic of signaling for the registration. According to this technique, a mobile terminal (MN100) has two or more interfaces (IF1 and IF2), registers, with a home agent (HA200), binding information between care-of addresses (CoA1 and CoA2) assigned to each interface and a home address (HoA0) of the MN, and further acquires home addresses (HoA1 and HoA2) exclusively for each interface and to be set for the interface and registers, with the HA, binding information between the HoA exclusively for each interface and a CoA corresponding to the HoA. For a flow desired to be sent and received by using only a specific interface, the HoA and CoA exclusively for the interface are used.

2 Claims, 19 Drawing Sheets

OTHER PUBLICATIONS

H. Soliman, et al., "Flow Bindings in Mobility IPv6 and Nemo Basic Support," IETF Internet Draft, Feb. 2007, pp. 1-37, p. 3, Line 25.
S. Gundavelli, et al., "Proxy Mobile IPv6," IETF Internet Draft, Oct. 2006, pp. 1-22, p. 3, Line 28.
International Search Report dated May 12, 2009.
Extended European Search Report, dated Nov. 14, 2012, for corresponding European Application No. 09708837.1-2413, 6 pages.
Wakikawa et al., "Multiple Care-of Addresses Registration," draft-wakikawa-mobileip-multiplecoa-05, Monami6 Working Group, Internet-Draft, Feb. 2006, 36 pages.

* cited by examiner

MOBILE TERMINAL AND NETWORK NODE

TECHNICAL FIELD

The present invention relates to a mobile terminal and a network node capable of performing packet communication using a wireless communication function while moving, and more particularly to a mobile terminal and a network node having two or more radio communication interfaces.

BACKGROUND ART

A mobile node (MN) using mobile IP (see Non-Patent Document 1 cited below. The mobile IP may also be referred to as CMIP below.) registers a care-of address (CoA) as a destination address with a home agent (HA) managing the home address (HoA) of the mobile node, enabling a request for forwarding, to the CoA, of packets destined to the HoA. In this specification, a mobile terminal capable of performing communication using a wireless communication function while moving is called a mobile node (MN). In other words, the MN in this specification does not always need to implement mobile IP.

Further, if the MN can register two or more CoAs in association with one HoA at the same time, the MN having two or more interfaces (which may be abbreviated as "IF" below) can register two or more CoAs assigned to the respective interfaces to use the CoAs, enabling switching between the CoAs depending on the state of each interface. Non-Patent Document 2 cited below describes a technique for allowing a MN to register, with a HA, two or more CoAs in association with one HoA.

On the other hand, when a HA receives the registration of two or more CoAs from a MN, the HA can select a CoA based on the intention of the MN if the HA can acquire, from the MN, information (flow control information, Routing Rule) for determining which CoA should be used as the destination of packets destined to the HoA of the MN.

For example, Non-Patent Document 3 cited below describes a technique for causing a MN to register flow control information with a HA as a technique for enabling the HA to select a CoA according to the flow. This flow control information includes flow information (Routing Filter) consisting of pieces of information (5-tuple) such as a destination address, a source address, a destination port number, a source port number, and a protocol number, and a flow to be identified is represented by one or more pieces of information, or a combination of all pieces of information. The flow control information also includes information in which a flow ID for identifying each piece of flow information is associated with a CoA (or a Binding Unique Identifier (BID) for identifying the CoA) used as a destination. The flow ID may be information for identifying an actual flow. If desiring to set a specific IF as a forwarding destination for a certain flow, the MN notifies the HA of flow control information including a flow ID for identifying the flow and a CoA assigned to an IF desired to be set as the forwarding destination of this flow or a BID for identifying the CoA.

Further, if the flow control information is notified from the MN, the HA receiving the registration of two or more CoAs forwards packets according to the flow control information. However, if the flow control information is not notified from the MN, the HA can switch CoAs as forwarding destinations according to its path selection policy. In this case, the HA can consider the connection conditions of the MN, communication path conditions and the conditions of communication with other nodes to select a CoA to which packets addressed to the MN are to be sent, so that the HA can switch over to a path more effective and suited to the conditions the HA can figure out.

Further, in Non-Patent Document 4 cited below, Proxy Mobile IP (PMIP, e.g., Proxy Mobile IPv6) is defined as a network-based mobility control protocol. PMIP is a technique for performing the mobility management of the MN on the network side to eliminate the need for the MN to perform processing for mobility control. Each network in a domain (PMIP domain) providing PMIP is configured to advertise the same home prefix to a specific MN at all times, so that any MN changing its network connection does not need to change its address, enabling the MN to act simply as an IPv6 node without the need to be aware of the presence of a HA.

On the other hand, on the network side, a Mobile Access Gateway (MAG) performs mobility control as a proxy node of the MN not only to advertise the home prefix to the MN, but also to register, with a Local Mobility Anchor (LMA), its address (or its prefix) as location information on the destination of the MN. The LMA manages the location information on the MN in the PMIP domain, and corresponds to a HA in mobile IP. Thus, packets destined to the home address of the MN are intercepted by the LMA, forwarded from the LMA to the MAG, and further sent from the MAG to the MN.

Non-Patent Document 1: D. Johnson, C. Perkins, J. Arkko, "Mobility Support in IPv6," RFC3775, June 2004.

Non-Patent Document 2: R. Wakikawa, T. Ernst, K. Nagami, "Multiple Care-of Addresses Registration," draft-ietf-monami6-multiplecoa-03.txt, July 2007.

Non-Patent Document 3: H. Soliman, N. Montavont, N. Fikouras, K. Kuladinithi, "Flow Bindings in Mobile IPv6 and Nemo Basic Support," draft-soliman-monami6-flow-binding-04.txt, February 2007.

Non-Patent Document 4: S. Gundavelli, K. Leung, V. Devarapalli, "Proxy Mobile IPv6," draft-sgundave-mipv6-proxymipv6-00, October 2006.

However, in the case of use of the technique as shown in Non-Patent Document 3 mentioned above, in which the MN registers, with the HA, flow control information for specifying the forwarding destination of a flow, the MN has to register, with the HA, flow control information on all flows each specifying a specific IF as the forwarding destination.

For example, upon receiving a flow related to communication originated from a Correspondent Node (CN), if the MN wants the flow to be forwarded to a specific IF, the MN registers, with the HA, flow control information for specifying the forwarding destination of the flow. Similarly, upon starting communication with the CN, if the MN wants a flow sent from the CN in connection with the communication to be forwarded to a specific IF, the MN also needs to register flow control information for specifying the forwarding destination of the flow.

Thus, the MN has to register, with the HA, flow control information on each flow whose forwarding destination the MN wants to specify. Therefore, as the number of flows whose forwarding destinations the MN wants to specify increases, the number of pieces of flow control information registered by the MN increases. The increase in the number of flows poses a problem of dramatically increasing the load on the HA for forwarding destination control and the load on the MN for registration of flow information.

Further, since the number of registration messages sent from the MN to register the flow control information and the number of messages as responses to the registration messages increase, the network traffic increases, causing a potential problem of packet loss or delay.

DISCLOSURE OF THE INVENTION

In order to solve the above problems, it is an object of the present invention to reduce the processing load accompanied by registration of flow control information and reduce the traffic of signaling for the registration.

In order to attain the above object, the present invention provides a mobile terminal capable of attaching to a network to perform packet communication, the mobile terminal comprising:

a plurality of radio communication interfaces;

address holding unit configured to hold a common address assigned to the plurality of radio communication interfaces in common and a dedicated address assigned individually to each of the plurality of radio communication interfaces; and binding registration processing unit configured to process first binding information indicative of a correspondence relationship between the mobile terminal and the common address and second binding information indicative of a correspondence relationship between each of the plurality of radio communication interfaces and the dedicated address assigned to each of the plurality of radio communication interfaces in such a manner to be registered with a network node for performing forwarding processing on a packet addressed to the mobile terminal.

This configuration can reduce the processing load accompanied by registration of flow control information and reduce the traffic of signaling for the registration.

In addition to the above configuration, the mobile terminal of the present invention may also comprise flow determination unit configured to determine whether a flow necessary to be sent and received by using only a specific interface among the plurality of radio communication interfaces exists, and if determining that a flow necessary to be sent and received by using only a specific interface among the plurality of radio communication interfaces exists, controlling the binding registration processing unit to send the second binding information.

According to this configuration, when there is a need to send and receive a flow specifying a specific interface, a dedicated address can be set and registered.

In addition to the above structure, the mobile terminal of the present invention may further comprise address generation unit configured to generate the dedicated address assigned to each of the plurality of radio communication interfaces.

According to this configuration, since the mobile terminal itself generates a dedicated address, the dedicated address can be acquired quickly.

In addition to the above configuration, the mobile terminal of the present invention may further comprise address assignment request unit configured to request a specific network node on the network to assign the dedicated address to each of the plurality of radio communication interfaces.

According to this configuration, a dedicated address can be acquired easily from the network.

Further, in addition to the above configuration, the mobile terminal of the present invention may be such that the specific network node is a DHCP server or a home agent of the mobile terminal.

According to this configuration, a dedicated address can be acquired easily from the DHCP server for managing the assignment of addresses or the home agent.

In addition to the above configuration, the mobile terminal of the present invention may further comprise address determination unit configured to distinguish between the dedicated address and the common address by referring to classification information, wherein the classification information is added to an address provided from the specific network node to indicate as which of the dedicated address and the common address the address is usable.

This configuration enables the mobile terminal to make sure to distinguish between an address usable as a dedicated address and an address usable as a common address.

Further, in addition to the above configuration, the mobile terminal of the present invention may be such that the common address and the dedicated address are home addresses, and the binding registration processing unit is configured to register the first binding information and the second binding information with a home agent of the mobile terminal.

This configuration enables a mobile terminal running mobile IP to reduce the processing load accompanied by registration of flow control information and reduce the traffic of signaling for the registration.

Further, in addition to the above configuration, the mobile terminal of the present invention may be such that the second binding information includes information indicative of association between the dedicated address and a care-of address assigned to a radio communication interface corresponding to the dedicated address.

According to this configuration, information indicative of association between a home address as a dedicated address and a care-of address assigned to a radio communication interface corresponding to the dedicated address can be registered.

In addition to the above configuration, the mobile terminal of the present invention may further comprise external network determination unit configured to determine whether at least two radio communication interfaces among the plurality of radio communication interfaces are connected to different external networks, respectively, and if determining that at least two radio communication interfaces among the plurality of radio communication interfaces are connected to different external networks, respectively, controlling the binding registration processing unit to send the second binding information.

According to this configuration, when there are two or more packet transmission paths from a home agent to a mobile terminal via external networks, packet transmission can be achieved in such a manner that a dedicated address is set and registered to specify any one of packet transmission paths.

Further, in addition to the above configuration, the mobile terminal of the present invention may be such that PMIP is executed on the network, and the binding registration processing unit is configured to request a proxy node, to which a radio communication interface corresponding to the dedicated address is connected, to notify a location information management device in the network of identification information of the proxy node and the second binding information including information indicative of association with the dedicated address.

According to this configuration, flow control can be achieved in PMIP without registering flow control information with a location information management device (LMA), enabling reduction in processing load accompanied by registration of flow control information and reduction in traffic of signaling for the registration.

In addition to the above configuration, the mobile terminal of the present invention may further comprise proxy node determination unit configured to determine whether at least two radio communication interfaces among the plurality of radio communication interfaces are connected to different proxy nodes, respectively, and if determining that at least two radio communication interfaces among the plurality of radio communication interfaces are connected to different proxy nodes, respectively, controlling the binding registration processing unit to send the second binding information.

According to this configuration, when there are two or more packet transmission paths to a mobile terminal via different MAGs, packet transmission can be achieved in such a manner that a dedicated address is set and registered to specify any one of packet transmission paths.

In addition to the above configuration, the mobile terminal of the present invention may further comprise address setting unit configured to determine whether, upon transmission of the packet, the packet is a packet belonging to a flow necessary to be sent and received by using only a specific interface among the plurality of radio communication interfaces, and if determining that the packet is a packet belonging to a flow necessary to be sent and received by using only the specific interface, using the dedicated address corresponding to the specific interface as the source address of the packet According to this configuration, not only a packet sent from the mobile terminal but also a packet returned as its response can be sent and received via a radio communication interface corresponding to the dedicated address.

In addition to the above configuration, the mobile terminal of the present invention may further comprise address setting unit configured to determine whether, upon transmission of the packet, the packet is a packet belonging to a flow necessary to be sent and received by using only a specific interface among the plurality of radio communication interfaces, and if determining that the packet is not a packet belonging to a flow necessary to be sent and received by using only the specific interface, using the common address as the source address of the packet.

According to this configuration, packets on which flow control does not need to be performed can be sent and received by using a common address.

Further, in addition to the above configuration, the mobile terminal of the present invention may be such that when switching is so performed that a flow using the common address as the source address of the packet will be sent and received by using only the specific interface, the binding registration processing unit is configured to perform processing for registering flow control information, explicitly indicative of a relationship between the flow and the specific interface, with a network node for performing forwarding processing on a packet addressed to the mobile terminal.

According to this configuration, when flow control of packets, on which flow control does not need to be performed, is started, flow control can be achieved by registering flow control information with a network node for performing packet forwarding processing.

In order to attain the above object, the present invention also provides a network node for performing forwarding processing on a packet addressed to a mobile terminal, the network node comprising:

binding holding unit configured to hold first binding information indicative of a correspondence relationship between a common address, assigned in common to a plurality of radio communication interfaces contained in the mobile terminal, and the mobile terminal, and second binding information indicative of a correspondence relationship between a dedicated address, assigned individually to each of the plurality of radio communication interfaces, and each of the plurality of radio communication interfaces; and packet to dedicated address forwarding unit configured to, when the dedicated address is set as the destination address of a packet addressed to the mobile terminal upon performing forwarding processing on the packet, forward the packet to a radio communication interface corresponding to the dedicated address.

This configuration can reduce the processing load accompanied by registration of flow control information and reduce the traffic of signaling for the registration.

In addition to the above configuration, the network node of the present invention may also comprise packet to common address forwarding unit configured to, when the common address is set as the destination address of a packet addressed to the mobile terminal upon performing forwarding processing on the packet, forward the packet to any radio communication interface among the plurality of radio communication interfaces of the mobile terminal.

This configuration enables the network node to select, at its discretion, a forwarding destination address of a packet addressed to the mobile terminal and for which a common address is set as the destination address.

In addition to the above configuration, the network node of the present invention may further comprise address assignment unit configured to, when the mobile terminal requests the network node to assign the dedicated address to each of the plurality of radio communication interfaces, assign the dedicated address to each of the plurality of radio communication interfaces of the mobile terminal.

This configuration enables the network node to provide an address usable as a dedicated address in response to an address assignment request from the mobile terminal.

The present invention has such a configuration as mentioned above to eliminate the need for a mobile terminal to register flow control information with an HA, enabling reduction in processing load accompanied by registration of flow control information and reduction in traffic of signaling for the registration.

BEST MODE FOR CARRYING OUT THE INVENTION

First to third embodiments of the present invention will now be described with reference to the accompanying drawings.

First Embodiment

Figure 1:
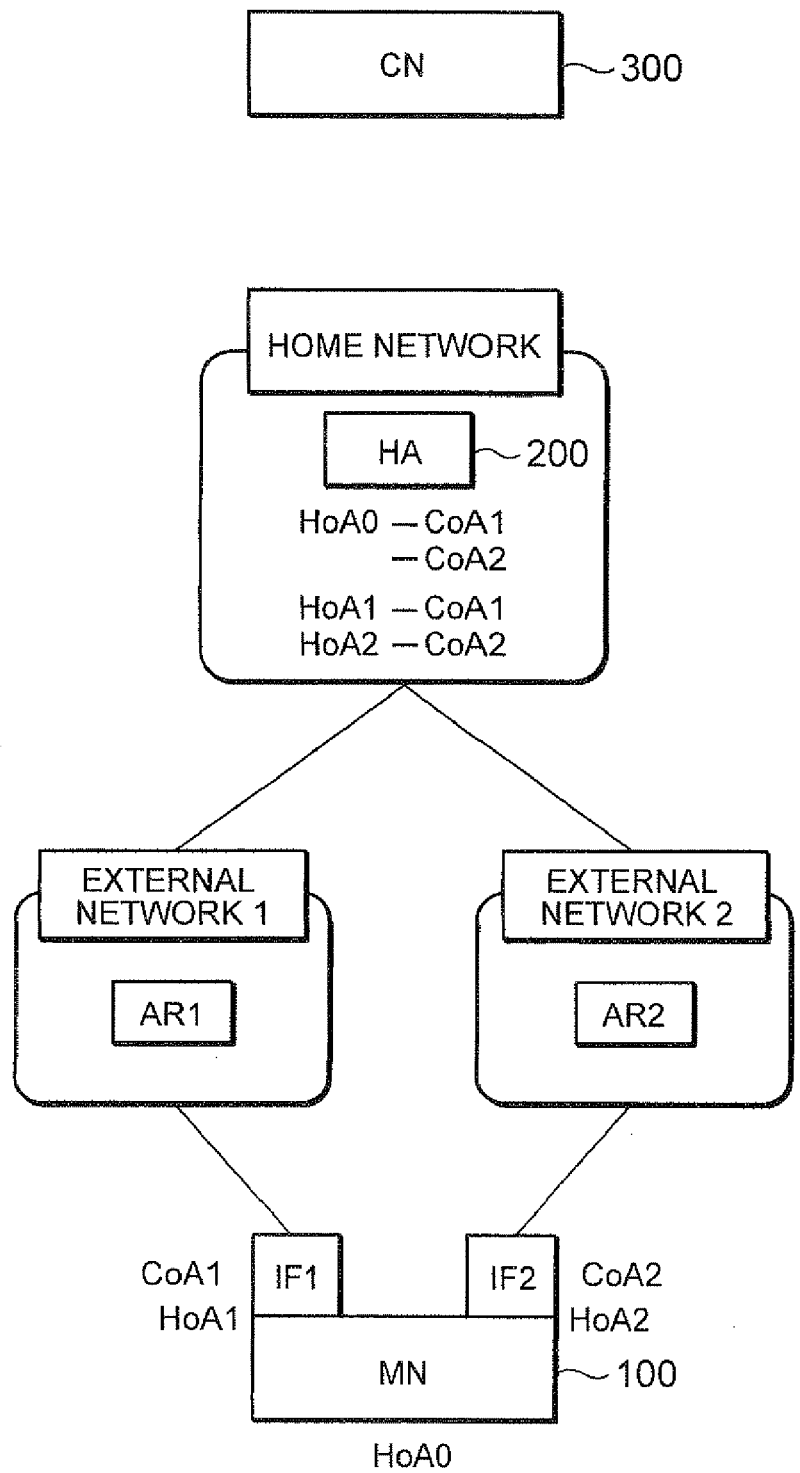
FIG. 1 It is a diagram showing the structure of a network according to a first embodiment of the present invention.

A first embodiment of the present invention will first be described. FIG. 1 is a diagram showing the structure of a network according to the first embodiment of the present invention. In FIG. 1, a MN 100 has two interfaces (hereinafter referred to as IF1 and IF2), and communicates with a CN 300. The IF1 of the MN 100 is connected to an access router (AR1) of an external network 1 and assigned CoA1. On the other hand, IF2 of the MN 100 is connected to an access router (AR2) of an external network 2 and assigned CoA2.

Also shown in FIG. 1 is a home network of the MN 100. This home network has a HA 200 for managing location information on the MN 100. The external networks 1 and 2 are different networks. The MN 100 registers with the HA 200 location information for associating both of CoA1 and CoA2 with a home address (HoA0) of the MN 100, so that binding information in which the two CoAs, CoA1 and CoA2, are associated with HoA0 is registered with the HA 200. For example, in a 3GPP network, a MN is called a User Equipment (UE), and a node called Packet Data Network Gateway (PDN-GW) functions as a HA. On the other hand, in a trusted non-3GPP network, a node called Access Gateway (AGW) functions as an AR, while in an untrusted non-3GPP network, a node called evolved Packet Data Gateway (ePDG) functions as the AR.

Figure 2:
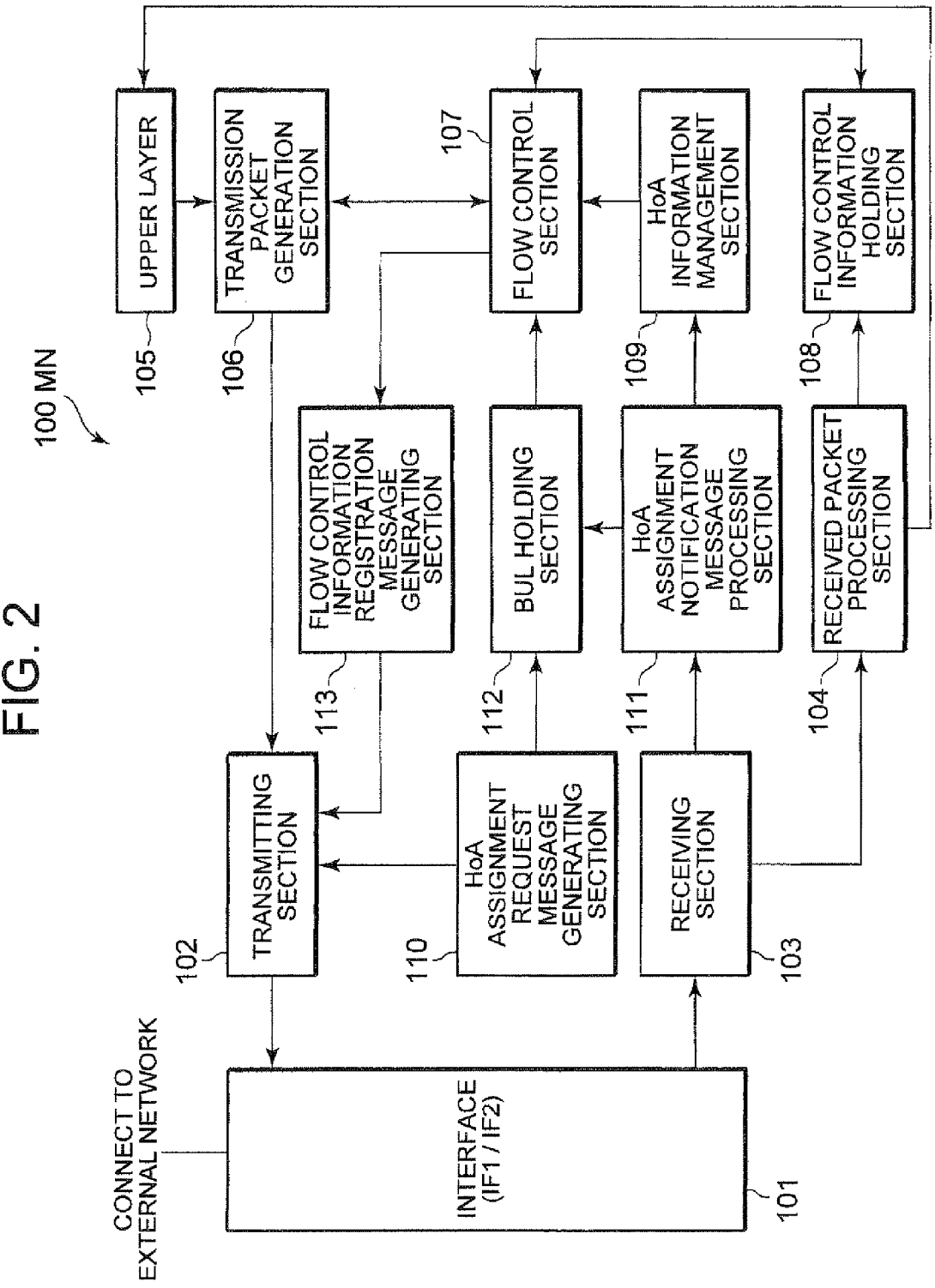
FIG. 2 It is a diagram showing the configuration of a MN according to the first embodiment of the present invention.

Next, the configuration of the MN 100 according to the first embodiment of the present invention will be described. FIG. 2 is a diagram showing the configuration of a MN according to the first embodiment of the present invention. Note that the MN 100 shown in FIG. 1 has the configuration shown in FIG. 2.

The MN 100 shown in FIG. 2 has an interface 101, a transmitting section 102, a receiving section 103, a received packet processing section 104, an upper layer 105, a transmission packet generation section 106, a flow control section 107, a flow control information holding section 108, a HoA information management section 109, a HoA assignment request message generating section 110, a HoA assignment notification message processing section 111, a Binding Update List (BUL) holding section 112, and a flow control information registration message generating section 113.

The interface 101 is a communication interface used by the MN 100 for communication and connected to a network (external network). Here, the MN 100 has two or more interfaces 101 (for example, two interfaces IF1 and IF2). Note that the MN 100 has an interface wireless communication function capable of performing communication while moving freely.

The transmitting section 102 has the function of transmitting packets to nodes on a network (external network) connected via the interface 101.

The receiving section 103 has the function of receiving packets from nodes on the network (external network) connected via the interface 101.

The received packet processing section 104 has the function of processing the packets received at the receiving section 103. Data in the packets processed in the received packet processing section 104 are sent to the upper layer 105, for example. The received packet processing section 104 can also check whether the relationship between a flow ID of a received packet and the interface 101 that received the packet is consistent with flow control information held in the flow control information holding section 108.

The upper layer 105 is, for example, an application for handling data to be sent and received through packets, having the functions of receiving data from the received packet processing section 104 and instructing the transmission packet generation section 106 to perform generation of packet and transmission of data to be sent.

The transmission packet generation section 106 has the function of generating packet for data received from the upper layer 105 and generating packets to be sent. On this occasion, the transmission packet generation section 106 inquires of the flow control section 107 as to which interface 101 should be used in a packet flow for sending the data, and uses, as a source address, a HoA or CoA corresponding to the interface 101 specified according to the response from the flow control section 107.

The flow control section 107 has the function of determining whether a flow is to be sent and received by using only a specific interface 101. In the case of a flow desired to use only a specific interface 101 (either one of IF1 and IF2), the flow control section 107 acquires a CoA or BID corresponding to the interface 101 to be used, and inquires of the HoA information management section 109 as to the HoA (which may also be referred to as a dedicated HoA below) assigned only to the interface 101 for which the CoA or BID is set. On the other hand, in the case of a flow, which does not particularly specify use of any specific interface 101, or a flow indicating that both are usable, either one of IF1 and IF2 is selected, and a CoA or BID corresponding to the interface is acquired.

Upon determining whether a flow is to be sent and received by using only a specific interface 101 (IF1 or IF2), the determination may be made by checking an actual flow against information preset in the MN 100 or flow control information acquired from a HA in the network or an information server (for example, SIP server or Access Network Discovery and Selection Function (ADNSF) server in 3GPP). Alternatively, the determination may be made according to information set by a user or an operator. When the MN starts communication in response to a notification from the HA as to whether the flow is to use a dedicated HoA, the MN can select a common HoA or the dedicated HoA based on the information notified from the HA. For example, when a 3GPP network operator offers users a service to use two or more interfaces as forwarding destinations, use of the common HoA (or the dedicated HoA) is permitted as long as the communication meets a certain condition (e.g., communication with a specified correspondent or a node belonging to a common operator or a specified operator, communication in a specific time slot, or a specific type of communication such as a voice or video phone call or Web browsing). If not, control such as to instruct use of the dedicated HoA (or common HoA) may be performed.

Further, when there is a flow whose flow control information is not notified from the MN, or when the HA receives a flow sent to HoA0 and wants to specify an IF for the flow, the HA may request the MN to register the flow control information, or the HA may notify the MN of flow control information generated and used by itself. This is effective because the HA can request the MN to generate and register the flow control information when the flow control information is necessary for the HA even if the MN does not recognize the necessity of registering the flow control information. The MN receives the registration of flow control information from the HA, and when there is a flow specifying use of an interface, the MN can select later the dedicated HoA for the flow the transmission of which is started from the MN.

The HoA information management section 109 manages a HoA (which may be referred to as common HoA below) available for each interface 101 in common and the dedicated HoA assigned only to each interface 101. In response to inquiry from the flow control section 107, the HoA information management section 109 gives notice of the dedicated HoA assigned only to a specific interface 101. Then, the flow control section 107 provides a CoA or dedicated HoA corresponding to the interface 101 used for sending and receiving packets generated in the transmission packet generation section 106. The flow control section 107 can also refer to a BUL (Binding Update List) held in the BUL holding section 112 to instruct use of the CoA for communication with a CN performing binding update or use of the HoA for communication with a CN not performing binding update.

Even when the HoA0 has already been specified as the destination address of a packet passed from the transmission packet generation section 106, if the flow control section 107 decides to specify an interface 101 to be used for sending and receiving the flow, the flow control section 107 can instruct the flow control information registration message generating section 113 to generate a message (flow control information registration message) for the HA 200 to register flow control information for specifying either of CoA1 or CoA2 for HoA0. In response to this instruction from the flow control section 107, the flow control information registration message generating section 113 generates a message registering flow control information for requesting forwarding, to a specific interface 101, of a specific flow among flows to be sent and received by using HoA0 as the common HoA, and registers the flow control information with the HA 200. The flow control information registered with the HA 200 is stored in the flow control information holding section 108. The flow control information registration message enables flow control without changing the address (common HoA) currently in use, but the flow control may also be achieved by simply changing the address currently in use from the common HoA to the dedicated HoA.

In the prior art, it is necessary to send this flow control information registration message for all flows to be subjected to flow control and to register flow control information with the HA 200. In contrast, according to the present invention, the flow control information registration message is sent for only an exceptional flow desired to specify an interface 101 among flows already in communication using HoA0 as the common HoA, i.e., for only a flow necessary to specify either of IF1 and IF2 as the forwarding destination. On the other hand, in the case of a flow using either of HoA1 and HoA2 as the dedicated HoAs of IF1 and IF2, since the forwarding destination is already determined, the flow control information registration message does not need sending.

The flow control information holding section 108 has the function of holding flow control information. For example, the flow control information held in the flow control information holding section 108 is information in which information such as an address representing a flow, information (flow ID) for identifying the flow control information and information (CoA or BID) for identifying an interface 101 to be used for sending and receiving the flow are associated.

The HoA information management section 109 has the functions of holding information, such as information indicating that HoA1 is assigned as the dedicated HoA for IF1 (CoA1 or BID1) as mentioned above, information indicating that HoA2 is assigned as the dedicated HoA for IF2 (CoA2 or BID2), and information indicating that HoA0 is usable as the common HoA that is not the dedicated address of the interface 101, and the function of managing HoAs available for the MN 100.

The HoA assignment request message generating section 110 has the function of generating a HoA assignment request message for requesting the HA 200 to assign a dedicated HoA to each of the two or more interfaces 101 of the MN 100, respectively. For example, this HoA assignment request message may include a CoA assigned to each interface 101 as information for identifying each interface 101 as a target of requesting the assignment of a HoA. Thus, if a CoA is included in the message for requesting the assignment of a HoA, the HA 200 can be notified that the CoA is a CoA associated with a home address assigned by the HA 200.

Thus, for example, in addition to requesting the HA 200 to assign dedicated HoAs to IF1 to which CoA1 is assigned and IF2 to which CoA2 is assigned, the HoA assignment request message can also function as a message for requesting the HA 200 to associate CoA1 with a HoA assigned to IF1 and CoA2 with a HoA assigned to IF2, and to register binding information indicative of their association in a binding cache. Further, the HoA assignment request message can request the assignment of a common HoA available for each interface 101 in common.

Here, although the description is made of the case where the MN 100 sends the HoA assignment request message to the HA 200 on the presumption that the HA 200 assigns HoAs, the assignment of HoAs may be requested of any communication device (e.g., a Dynamic Host Configuration Protocol (DHCP) server or an Authentication Authorization Accounting (AAA) server), which assigns HoAs. Further, the assignment of a dedicated HoA may be requested in a key exchange protocol (Internet Key Exchange (IKE) or IKEv2) used in establishing Security Association (SA) with the HA 200. In these cases, it is desired that information indicative of requesting a dedicated HoA be contained in the DHCP server or AAA server, or included in a message to be sent to the HA 200. In a case where both the dedicated HoA and the common HoA can be assigned through the HoA assignment request message, it is desired that information (classification information) indicating whether the assigned HoA should be used as the dedicated HoA or the common HoA be added to the HoA and provided to the MN 100. The MN 100 can request the assignment of a dedicated HoA to either of IF1 and IF2. For example, when IF1 of the MN 100 is connected to a home network (which may be a network providing PMIP or GPRS tunneling protocol (GTP)) and IF2 is newly connected to an external network, since the MN 100 can know its home prefix via IF1, the MN 100 can request the HA 200 or an authentication server to assign an address generated from the prefix as the dedicated HoA of IF2 in authentication processing performed on IF2, in IKEv2, or through a BU message.

Further, upon assigning an address (or prefix) to IF1 connected to the home network, information explicitly indicating whether the assigned address (or prefix) is a dedicated HoA (or dedicated prefix) or a common HoA (or common prefix) may be added to assign the address to the MN 100. In this case, if the address assigned to IF1 is the dedicated HoA, the MN 100 can become aware that packets delivered to the address of IF1 are not forwarded to IF2 when IF2 is connected to the external network. When the MN 100 wants to use both interfaces as forwarding destinations as well as the dedicated HoA (or dedicated prefix), the MN 100 can request the assignment of a common HoA (or common prefix) separately. On the other hand, if the prefix assigned to IF1 is a common HoA (or common prefix), the MN 100 can request the assignment of a dedicated HoA (or dedicated prefix) to IF1 when IF2 is connected to the external network.

Further, the MN 100 may handle, as the dedicated address, the address already used for IF1 connected to the home network to assign both the common HoA and the dedicated HoA to IF2 connected to the external network. In this case, packets delivered to the newly assigned common HoA are forwarded to both IF1 and IF2, while packets delivered to the address already assigned to IF1 are not forwarded to IF2. When the HA assigns a unique prefix to the MN, rather than the address, the prefix assigned on IF1 becomes a prefix exclusively for IF1, and a common prefix for IF1 and IF2 and a prefix exclusively for IF2 are assigned separately.

The MN 100 can arbitrarily determine whether to handle the already used address as the common HoA or the dedicated HoA. However, if communication on IF1 is only a flow desired to use IF1, the address of IF1 may be handled as the dedicated HoA, requesting the assignment of a common HoA and a dedicated HoA for IF2, separately. Further, if there is only a flow that should only use IF1 in communication on IF1 when IF2 is not connected to the external network yet, handling the address of IF1 as the dedicated HoA can be selected as mentioned above. If there is a flow that can use both IF1 and IF2 in communication on IF1, a common HoA will be newly generated and assigned to IF1. In this case, when IF2 is connected to the external network, the MN 100 determines to use the address, used as the common HoA for IF1, as the common HoA for IF2 as well. Simultaneously, the MN 100 requests the assignment of a dedicated HoA to IF2.

The HoA assignment notification message processing section 111 has the function of processing a response message (HoA assignment notification message) to the HoA assignment request message from the HA 200. The HoA assignment notification message includes a dedicated HoA assigned to each interface 101 for which the assignment of a HoA is requested through the HoA assignment request message. The HoA assignment notification message processing section 111 passes, to the HoA information management section 109, information indicative of the association of a dedicated HoA with an interface 101 (CoA or BID) to which the dedicated HoA is assigned so that the HoA information management section 109 will manage the information.

The BUL holding section 112 holds the BUL for storing correspondents (CNs) to which binding update has been performed. The BUL stores for which CN binding indicative of the relationship between a common HoA and/or dedicated HoA and a CoA is registered. In the case of communication with a CN not stored in the BUL (i.e., CN to which binding update is not performed), a HoA (common HoA or dedicated HoA) is basically used.

Figure 10:
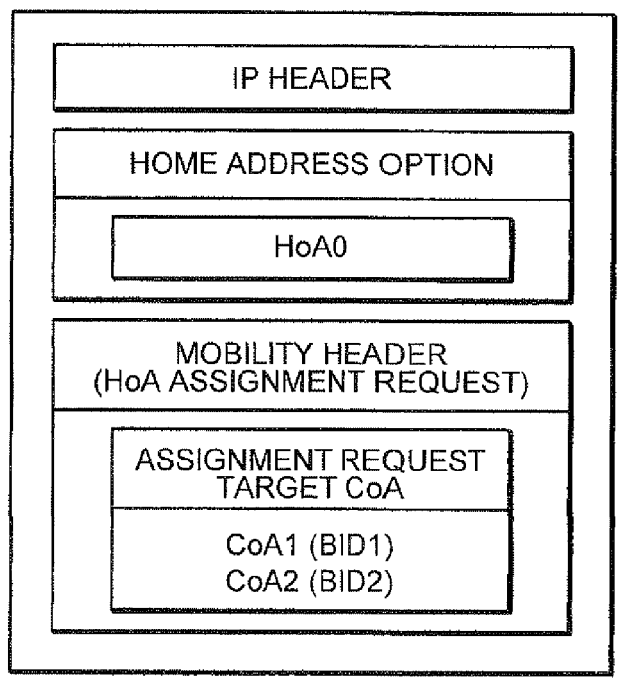
FIG. 10 It is a diagram showing an example of a HoA assignment request message sent from the MN to the HA in the first embodiment of the present invention.
Figure 11:
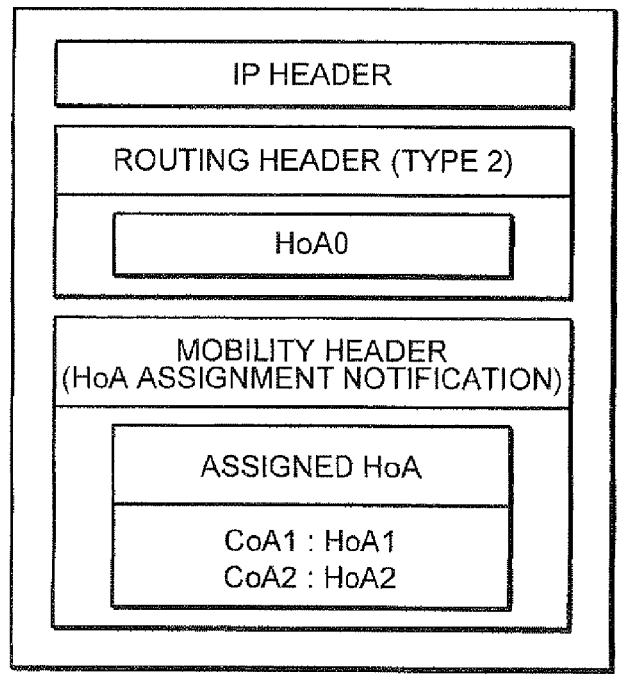
FIG. 11 It is a diagram showing an example of a HoA assignment notification message sent from the MN to the HA in the first embodiment of the present invention.

For the above-mentioned HoA assignment request message generated in the HoA assignment request message generating section 110, for example, a format as shown in FIG. 10 or FIG. 11 can be used. The HoA assignment request message generated in the HoA assignment request message generating section 110 is sent from the MN 100 to the HA 200, and processed in a HoA assignment request message processing section 205 (to be described later) of the HA 200.

FIG. 10 is a diagram showing an example of the HoA assignment request message sent from MN to HA in the first embodiment of the present invention. Shown in FIG. 10 is a structure example of the HoA assignment request message. This HoA assignment request message (HoA assignment request) is constructed using a mobility header. As shown in FIG. 10, an option indicative of target CoA to which a dedicated HoA is assigned (assignment request target CoA option) is included in the HoA assignment request message as information for identifying an interface to be assigned a dedicated HoA.

In this assignment request target CoA option, CoAs (CoA1 and CoA2) assigned respectively to two or more interfaces (IF1 and IF2) contained in the MN 100 are inserted. BID (binding identifier) may also be used as information for identifying a CoA, or both the CoA and the BID may be used. Each CoA inserted in this assignment request target CoA option becomes a CoA to be associated with a HoA when the HoA is assigned exclusively for an interface. In other words, when CoA1 and CoA2 are inserted in the assignment request target CoA option, HoA1 is assigned to CoA1 and HoA2 is assigned to CoA2. Here, the mobility header is used as a header for constructing the HoA assignment request message, but a destination option header or the like may also be used.

Figure 12:
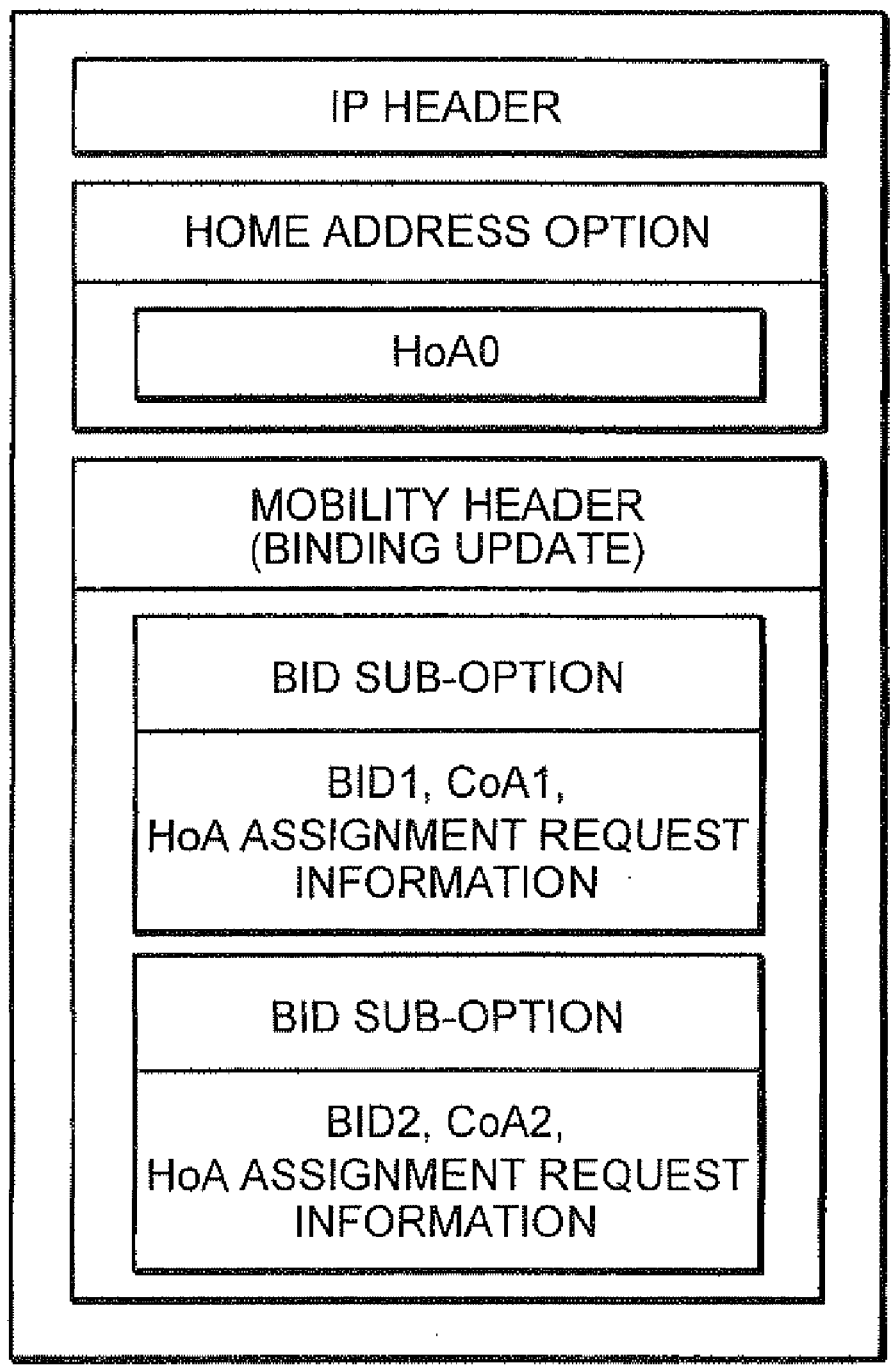
FIG. 12 It is a diagram showing another example of the HoA assignment request message in the first embodiment of the present invention.

FIG. 12 is a diagram showing another example of the HoA assignment request message in the first embodiment of the present invention. This HoA assignment request message is constructed using a mobility header indicative of a BU (Binding Update) message. As shown in FIG. 12, a BID sub-option is included in the HoA assignment request message as an option indicative of a CoA to be registered (registration target CoA) and a BID, and in the BID sub-option, HoA assignment request information is included as information indicative of requesting the assignment of a HoA exclusively for each interface. The HoA assignment request information may be a flag or the like. In this case, for example, if the flag is set, it means that the assignment of a dedicated HoA is requested, while if not, it means that the assignment of a common HoA is requested. Further, it may be explicitly indicated whether the address (or prefix) requested is the dedicated HoA (or dedicated prefix) or the common HoA (or common prefix). In this case, numerical information capable of making a distinction between both may be used instead of the flag to indicate for which of the common HoA (or common prefix) and the dedicated HoA (or dedicated prefix) assignment is requested.

Further, the HoA assignment request message shown in FIG. 11 has HoA assignment request information in both a BID sub-option including BID1 (CoA1) and a BID sub-option including BID2 (CoA2), respectively, and takes the form of a BU message for requesting the assignment of HoAs exclusively for respective interfaces to both of CoA1 and CoA2.

The CoA1 and CoA2 inserted in the BID sub-options become CoAs to be associated with HoAs when the HoAs are assigned exclusively to the interfaces, respectively. In other words, HoA1 is assigned to CoA1 and HoA2 is assigned to CoA2, respectively. When the HoA (common HoA) of the MN 100 used in common on each interface is not assigned yet, the above-mentioned HoA assignment request message can also be used to request the assignment of a common HoA at the same time. Alternatively, a message for requesting the assignment of a common HoA may be used to assign a HoA exclusively for each interface. The common HoA is a HoA assigned to the MN 100 regardless of the number of interfaces of the MN 100, which is the same as a normal HoA. The MN 100 can register, with the HA 200, binding indicative of the association of two or more CoAs (CoA1 and CoA2) with one common HoA as described in Non-Patent Document 2, for example. The HoA assignment request message may also be constructed using a message such as DHCPv6 or IKEv2. For example, in the case of use of IKEv2, information (Attribute) for requesting the assignment of a dedicated HoA (or dedicated prefix) is also included in a message (e.g., CFG_REQUEST) for requesting the assignment of a normal common HoA or a home prefix, and sent. If only the assignment of a unique home prefix is requested, rather than the common HoA, and if the MN 100 itself generates a HoA, information for requesting the generation and use of a dedicated HoA may be included in a home prefix assignment request message (e.g., CFG_REQUEST), and sent to check from the assigned prefix whether the generation and use of the dedicated HoA as well as the common HoA are possible. If the dedicated prefix is assigned separately, the MN 100 handles, as a dedicated HoA, an address generated from the dedicated prefix.

Figure 13:
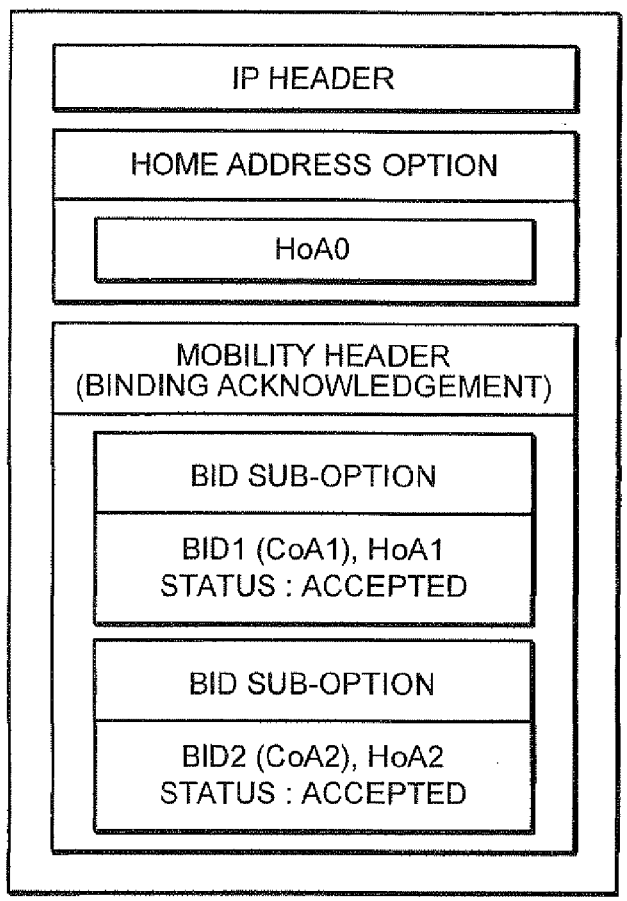
FIG. 13 It is a diagram showing another example of the HoA assignment notification message in the first embodiment of the present invention.

For the HoA assignment notification message processed in the above-mentioned HoA assignment notification message processing section 111, for example, a format as shown in FIG. 11 or FIG. 13 to be described below can be used. The HoA assignment notification message processed in the HoA assignment notification message processing section 111 is generated in a HoA assignment notification message generating section 207 (to be described later) of the HA 200, and sent from the HA 200 to the MN 100.

FIG. 11 is a diagram showing an example of the HoA assignment notification message sent from MN to HA in the first embodiment of the present invention. Shown in FIG. 11 is a structure example of the HoA assignment notification message. The HoA assignment notification message in FIG. 11 is a response message to the HoA assignment request message in FIG. 10. This HoA assignment notification message (HoA assignment notification) is made up using a mobility header. As shown in FIG. 11, an option (assigned HoA option) indicative of assigned HoAs is included in the HoA assignment notification message.

In this assigned HoA option, sets of HoAs assigned by the HA 200 to the MN 100 and CoAs to be assigned to the HoAs, respectively, are inserted. BID may also be used as information for identifying a CoA, or both the CoA and the BID may be used. Each set of HoA and CoA inserted in this assigned HoA option includes a CoA the assignment of which is requested and a HoA to be assigned exclusively for an interface corresponding to the CoA. In other words, the HA 200 assigns HoA1 to CoA1 and HoA2 to CoA2, respectively, and inserts a set of CoA1 and HoA1 and a set of CoA2 and HoA2 into the assigned HoA option. Here, the mobility header is used as a header for constructing the HoA assignment notification message, but a destination option header or the like may also be used.

FIG. 13 is a diagram showing another example of the HoA assignment notification message in the first embodiment of the present invention. This HoA assignment notification message is constructed using a mobility header indicative of a BA (Binding Acknowledgement) message.

As shown in FIG. 13, BID sub-options are included in the HoA assignment notification message as options, each of which indicates a CoA to be registered (registration target CoA) or a BID, and in the BID sub-option, status information indicative of a HoA exclusively for the interface and assigned to each CoA or BID and whether the registration of the binding cache is successful (accepted) or not is included.

The HoA assignment notification message shown in FIG. 13 has a BID sub-option including BID1 (CoA1) and a BID sub-option including BID2 (CoA2), and HoA1 and HoA2 assigned to the respective interfaces are inserted respectively in each of the BID sub-options of BID1 (CoA1) and BID2 (CoA2), taking the form of a BA message in which status information (accepted) indicative of successful registration of a binding cache of the association information is described. The HoA assignment notification message may also be constructed using a message such as DHCPv6 or IKEv2. For example, in the case of use of IKEv2, the assigned dedicated HoA is included in a message (e.g., CFG_REPLY) for giving notice of a normal common HoA or a home prefix, and sent. If only the home prefix is notified, rather than the common HoA, and if the MN 100 itself generates a HoA, information indicative of the availability of a dedicated HoA may be included in the home prefix assignment notification message (e.g., CFG_REPLY), and sent to indicate the availability of generation and use of the dedicated HoA from the assigned prefix as well as the common HoA.

Figure 3:
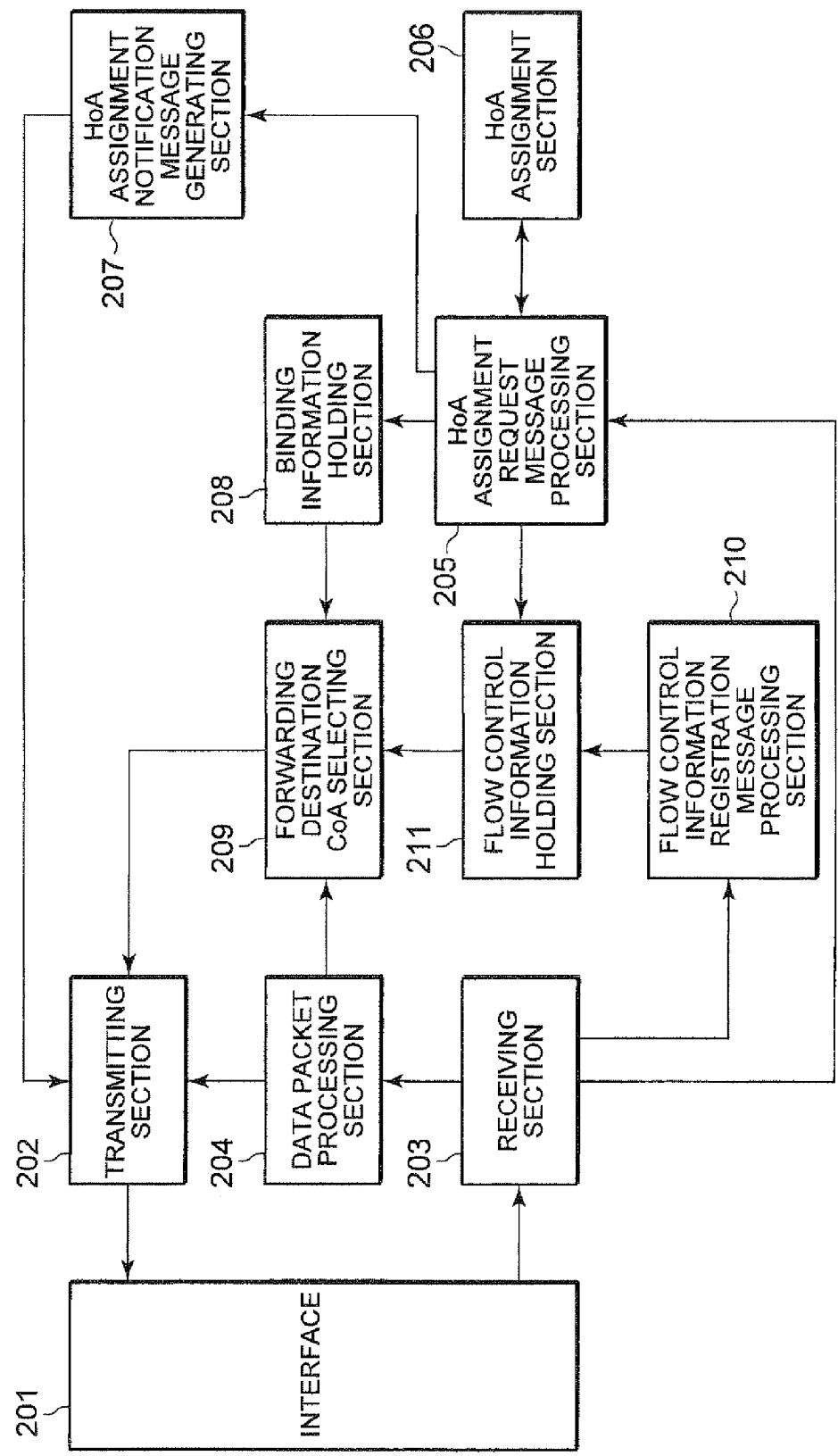
FIG. 3 It is a diagram showing the configuration of a HA according to the first embodiment of the present invention.

Next, the configuration of the HA 200 according to the first embodiment of the present invention will be described. FIG. 3 is a diagram showing the configuration of a HA according to the first embodiment of the present invention. Note that the HA 200 shown in FIG. 1 has the configuration shown in FIG. 3.

The HA 200 shown in FIG. 3 has an interface 201, a transmitting section 202, a receiving section 203, a data packet processing section 204, a HoA assignment request message processing section 205, a HoA assignment section 206, a HoA assignment notification message generating section 207, a binding information holding section 208, a forwarding destination CoA selecting section 209, a flow control information registration message processing section 210, and a flow control information holding section 211.

The interface 201 is a communication interface used by the HA 200. The transmitting section 202 has the function of transmitting packets through the interface 201. Upon forwarding a data packet, the transmitting section 202 sets a forwarding destination of the data packet in accordance with an instruction from the forwarding destination CoA selecting section 209. The receiving section 203 has the function of receiving packets through the interface 201. The receiving section 203 passes a received packet to the data packet processing section 204 when the received packet is a data packet, or to the HoA assignment request message processing section 205 when the received packet is a HoA assignment request message, or to the flow control information registration message processing section 210 when the received packet is a flow control information registration message.

The data packet processing section 204 has the function of performing forwarding processing on the data packet intercepted in the receiving section 203. The data packet processing section 204 inquires of the forwarding destination CoA selecting section 209 as to the forwarding destination corresponding to the destination address of the data packet.

The HoA assignment request message processing section 205 has the function of processing the HoA assignment request message sent from the MN 100. As mentioned above, the HoA assignment request message is a message for requesting the HA 200 to assign a HoA (dedicated HoA) exclusively for each interface 101 of the two or more interfaces 101 contained in the MN 100. The HoA assignment request message processing section 205 acquires, from the HoA assignment request message, a CoA assigned to the interface to which the dedicated HoA is to be assigned, and instructs the HoA assignment section 206 to assign the HoA to the acquired CoA.

The HoA assignment request message processing section 205 not only causes the binding information holding section 208 to hold a set of the dedicated HoA assigned from the HoA assignment section 206 and the corresponding CoA, but also passes the set to and instructs the HoA assignment notification message generating section 207 to generate a HoA assignment notification message.

The HoA assignment section 206 has the function of newly assigning a dedicated HoA to the passed CoA in accordance with the instruction from the HoA assignment request message processing section 205. The newly assigned HoA is generated from the home prefix of the MN 100 managed by the HA 200, using an address different from the common HoA already assigned to the MN 100 and any other HoAs used by any other MNs 100. If the HA 200 can assign a new prefix to the MN 100, the HA 200 may assign a new prefix to the MN 100 rather than generate another HoA from the home prefix preassigned to the MN 100.

The HoA assignment notification message generating section 207 has the function of generating a HoA assignment notification message in accordance with an instruction from the HoA assignment request message processing section 205 to notify the MN 100 of the HoA assigned by the HoA assignment section 206. The HoA assignment notification message generated in the HoA assignment notification message generating section 207 is sent to the MN 100 by means of the transmitting section 202.

Figure 14:
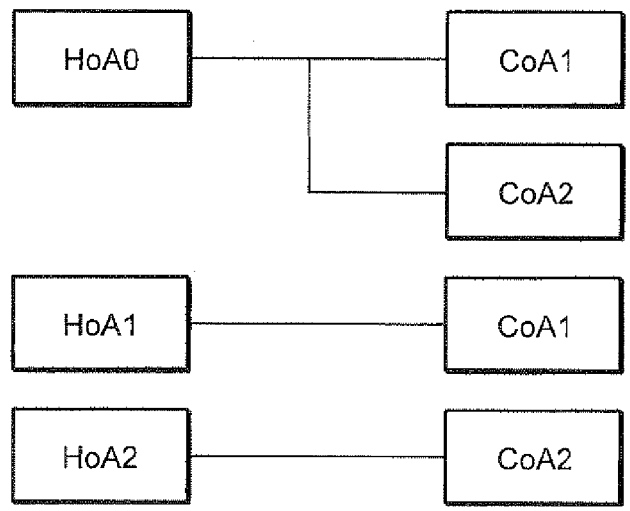
FIG. 14 It is a diagram showing an example of address binding information on the MN in the first embodiment of the present invention.

The binding information holding section 208 has the function of holding binding information indicative of the association between HoA and CoA of the MN 100. As the binding information, for example, information in which a dedicated HoA exclusively for one CoA is associated with the CoA is used in addition to information in which one common HoA is associated with two or more CoAs as disclosed in Non-Patent Document 2. In other words, when the MN 100 requests the assignment of dedicated HoAs to IF1 and IF2, respectively, binding information in which a dedicated HoA (HoA1) is associated with CoA1 and binding information in which a dedicated HoA (HoA2) is associated with CoA2 are held in the binding information holding section 208 in addition to the binding information in which the common HoA (HoA0) is associated with the two CoAs (CoA1 and CoA2) as shown in FIG. 14. In order to indicate that these pieces of binding information are information on the MN 100, ID information (MN-ID) for identifying the MN 100 may be added to each piece of information.

Upon forwarding the packet passed from the data packet processing section 204 to the MN 100, the forwarding destination CoA selecting section 209 performs processing for selecting a CoA of the MN 100 to be used as the forwarding destination and generating an encapsulated packet.

Basically, the forwarding destination CoA selecting section 209 refers to the binding information held in the binding information holding section 208. If the common HoA is used as the destination address of a packet received at the receiving section 203, the forwarding destination CoA selecting section 209 can select any CoA from the two or more CoAs associated with the common HoA and use it as the forwarding destination. At this time, the forwarding destination CoA selecting section 209 can select the CoA based on the conditions of the HA 200 itself (network conditions or policy). On the other hand, if a dedicated HoA is used as the destination address of a packet received at the receiving section 203, the forwarding destination CoA selecting section 209 selects, as the forwarding destination, a CoA associated with the dedicated HoA in the binding information.

In consideration of the selection of the forwarding destination in the forwarding destination CoA selecting section 209 as mentioned above, the MN 100 uses, for a flow of packets to be sent and received on a specific interface (e.g., IF1), the dedicated HoA (HoA1 corresponding to CoA1 of IF1) is used to perform communication. In this case, the destination address of packets from a CN 300 as a correspondent of the flow is the dedicated HoA (HoA1 corresponding to CoA1 of IF1), and the packets are forwarded to CoA1 (IF1) by the HA 200 that has intercepted the packets. On the other hand, for a flow of packets, which does not require communication using a specific interface among the two or more interfaces (which is unnecessary to specify any interface used), the MN 100 has only to perform communication using the common HoA (HoA0). In this case, the HA 200 arbitrarily selects a forwarding destination for the flow using the common HoA so that the MN 100 can receive the packets on any interface among the two or more interfaces.

As mentioned above, according to the present invention, the basic operation is such that the forwarding destination CoA selecting section 209 refers to the binding information held in the binding information holding section 208 to select a forwarding destination. In addition, the forwarding destination CoA selecting section 209 preferentially refers to a condition held in the flow control information holding section 211 as an exceptional condition. In the flow control information holding section 211, an instruction from the MN 100 requesting forwarding of communication being performed using the common HoA to a specific interface (specific CoA) is held. For example, suppose that the MN 100 wants to communicate using only a specific interface during a communication session after determining use of any interface to communicate and starting the communication using the common HoA. This is the exceptional condition set through a flow control information registration message.

The flow control information registration message processing section 210 has the function of processing the flow control information registration message sent from the MN 100 to give notice of an exceptional flow for which the MN 100 wants to specify a specific interface among flows already being communicating using the common HoA (HoA0). The flow control information registration message processing section 210 causes the flow control information holding section 211 to hold flow control information included in the flow control information registration message.

The flow control information holding section 211 has the function of holding the flow control information indicative of the instruction from the MN 100 requesting forwarding of communication being performed using the common HoA to a specific interface (specific CoA).

Figure 4:
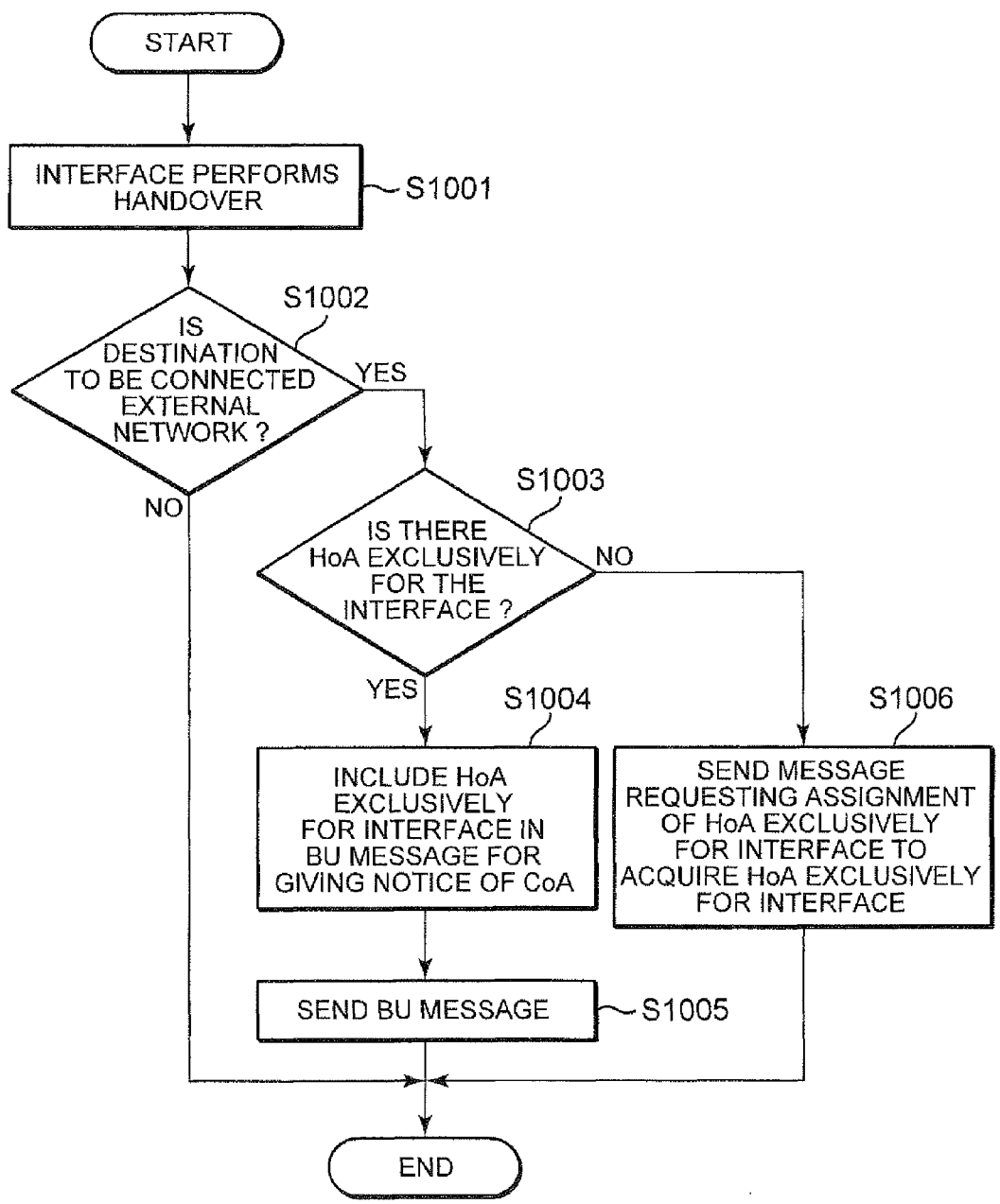
FIG. 4 It is a flowchart showing an example of the operation of the MN in the first embodiment of the present invention.

Next, the operation of the MN in the first embodiment of the present invention will be described. FIG. 4 is a flowchart showing an example of the operation of the MN in the first embodiment of the present invention.

In FIG. 4, when an interface performs a handover (step S1001), the MN 100 determines whether a new destination to be connected by the handover is an external network (step S1002). If the new destination is an external network (i.e., a network other than the home network), it is then checked whether a HoA exclusively for the interface (dedicated HoA assigned to the interface) has already been assigned (step S1003). If the HoA exclusively for the interface that newly performed the handover to the external network already exists (for example, when the interface was connected to another external network before the handover), the MN 100 performs processing for including the dedicated HoA of the interface in a BU message for giving notice of a CoA newly acquired on the external network after the handover (step S1004), and sends this BU message (step S1005).

For example, if the CoA of IF1 before the handover is CoA1 and the CoA of IF1 after the handover is CoA3, this BU message is a message for rewriting, with CoA3, CoA1 associated with the common HoA (HoA0) and CoA1 associated with the dedicated HoA (HoA1), respectively. In other words, for example, if first binding information in which the common HoA (HoA0) is associated with two CoAs (CoA1 corresponding to IF1 and CoA2 corresponding to IF2), second binding information in which the dedicated HoA (HoA1) is associated with CoA1, and third binding information in which the dedicated HoA (HoA2) is associated with CoA2 are registered with the HA 200, the first binding information and the second binding information are rewritten by the BU message sent in step S1004, and binding information to be registered with the HA is changed to first binding information in which the common HoA (HoA0) is associated with two CoAs (CoA3 corresponding to IF1 and CoA2 corresponding to IF2), second binding information in which the dedicated HoA (HoA1) is associated with CoA3, and third binding information in which the dedicated HoA (HoA2) is associated with CoA2.

On the other hand, in step S1003, if the HoA exclusively for the interface that newly performed the handover to the external network does not exist (for example, when it was connected to the home network before the handover), the MN 100 sends a message (HoA assignment request message) requesting the assignment of a HoA exclusively for the interface to acquire the dedicated HoA assigned only to the interface (step S1006). Here, if a new CoA is inserted in the HoA assignment request message, the message can function as a BU message to register, with the HA 200, the assignment of the HoA exclusively for the interface and its association with the CoA. In addition, after the HoA exclusively for the interface is acquired, a BU message for registering association between this HoA and the new CoA can also be sent.

In the above-mentioned operation shown in FIG. 4, a HoA exclusively for each interface is assigned immediately after the handover, but the timing of assigning a HoA exclusively for each interface is optional. The HoA assignment request message may be sent when it is determined that the assignment of a HoA exclusively for each interface is desired. For example, it may be sent during the attachment to the home network, or when a flow necessary to be forwarded to a specific interface (specific CoA) after attachment to the external network occurs. Alternatively, the request may be made in an authentication process performed upon attachment to the external network, or the assignment of the dedicated HoA may be requested using a message (e.g., CFG_REQUEST) used in IKEv2 upon establishing IKEv2 security association with the HA 200. When a flow desired to be sent and received by specifying an interface exists, it is desired to set and register the dedicated HoA before sending and receiving the flow so that communication of the flow will be performed by using only the specific interface.

Figure 5:
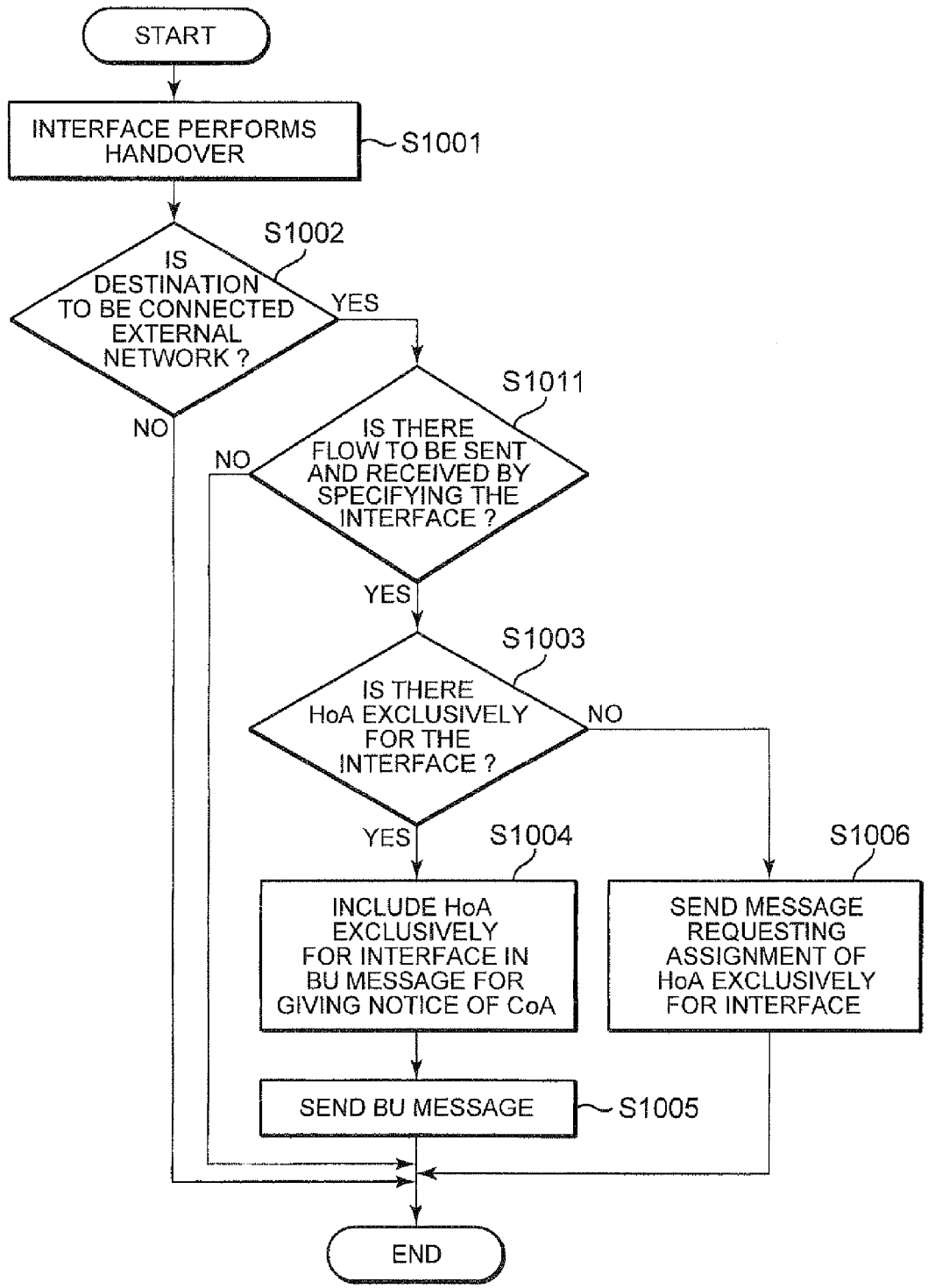
FIG. 5 It is a flowchart showing another example of the operation of the MN in the first embodiment of the present invention.

Further, for example, even if the new destination after the handover is an external network, it is determined as shown in FIG. 5 whether a flow desired to be sent and received only via the interface that performed the handover exists (i.e., whether there is a flow to be sent and received by specifying the interface) (step S1011). In this case, the operation may be such that if there is a flow desired to be sent and received only via the interface that performed the handover, the HoA exclusively for the interface is set, while if there is no flow desired to be sent and received only via the interface that performed the handover, the HoA exclusively for the interface is set at any other timing without being set at this timing.

Next, a description will be made of data transmission processing performed by the MN 100 and packet forwarding processing performed by the HA 200 in the first embodiment of the present invention when the MN 100 registers, with the HA 200, a common HoA common to interfaces and a dedicated HoA exclusively for each interface.

Figure 6:
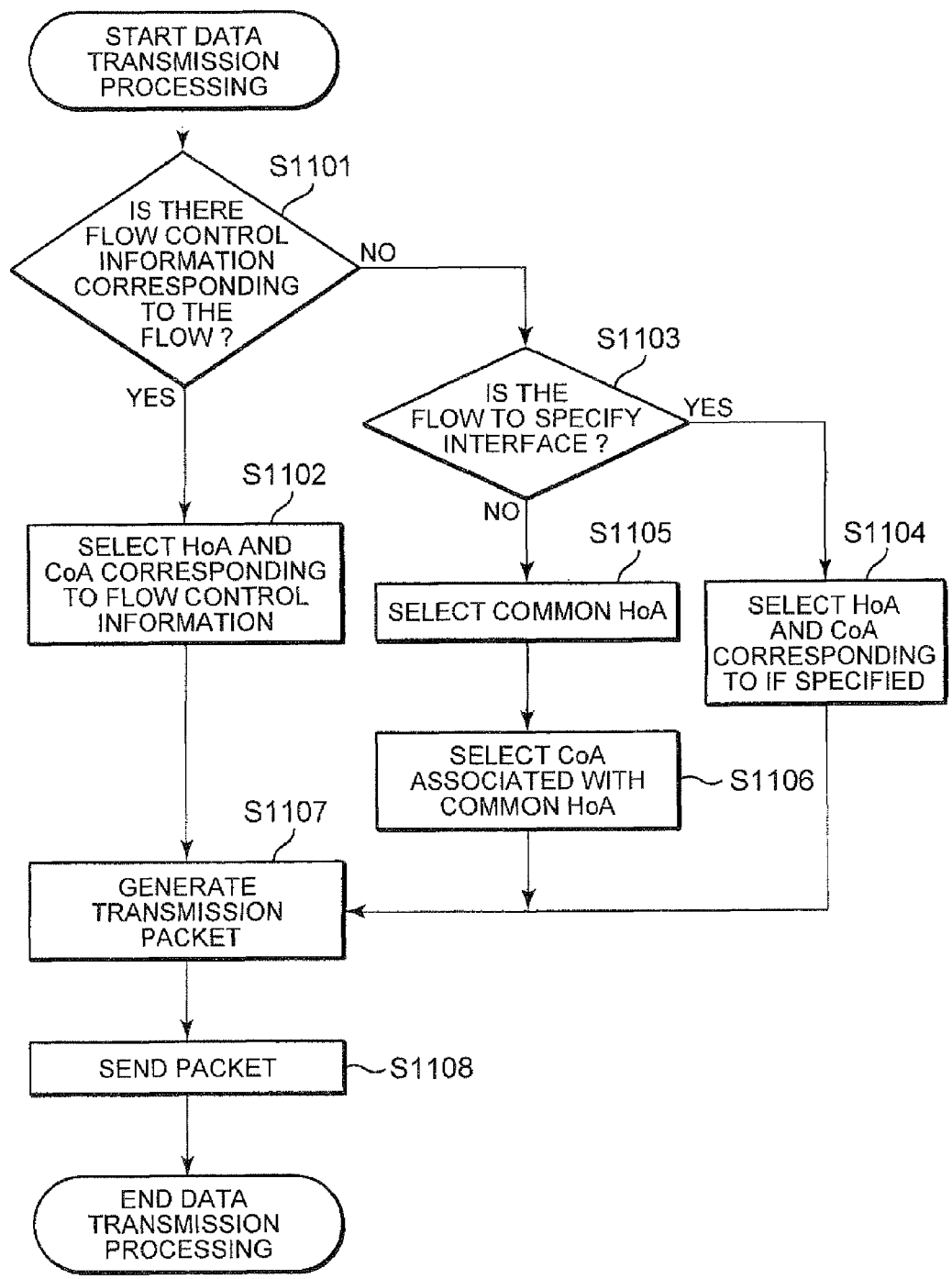
FIG. 6 It is a flowchart showing an example of data transmission processing at the MN in the first embodiment of the present invention.

First, the data transmission processing performed by the MN 100 will be described. FIG. 6 is a flowchart showing an example of data transmission processing at the MN in the first embodiment of the present invention.

In FIG. 6, upon performing data transmission processing, the MN 100 checks whether flow control information corresponding to a flow of packets sent in the data transmission processing exists in the flow control information holding section 108 (step S1101). If the flow control information exists, the MN 100 selects HoA and CoA corresponding to the flow control information (step S1102), generates a transmission packet using this HoA or CoA as the source address (step S1107), and sends the packet (step S1108).

On the other hand, if no flow control information exists in step S1101, it is determined whether the flow is a flow to be sent and received by specifying an interface (step S1103). If it is determined that an interface should be specified so that the flow will be sent and received by using only the specific interface, the MN 100 selects dedicated HoA and CoA corresponding to the interface used for communication of the flow (step S1104), generates a transmission packet using this HoA or CoA as the source address (step S1107), and sends the packet (step S1108).

On the other hand, if it is determined in step S1103 that no interface needs to be specified, the MN 100 selects a common HoA (HoA0) (step S1105), selects a CoA associated with this common HoA (step S1106), generates a transmission packet using this HoA or CoA as the source address (step S1107), and sends the packet (step S1108).

Here, the MN 100 sets an address based on flow control information when the flow control information exists, but the MN 100 may advance to determination processing in step S1103 even when the flow control information exists to perform address selection processing independent of flow control information.

Figure 7:
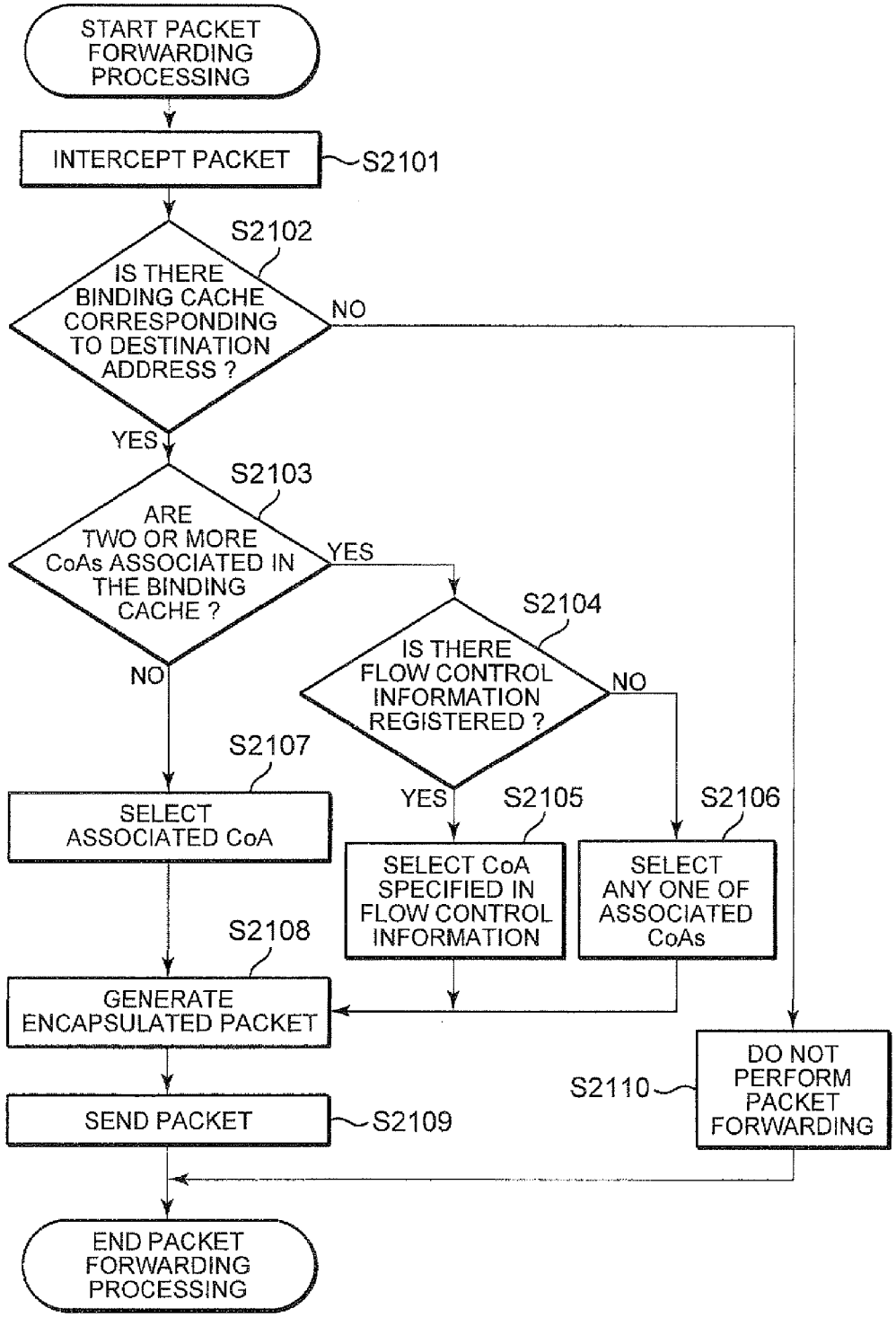
FIG. 7 It is a flowchart showing an example of packet forwarding processing at the HA in the first embodiment of the present invention.

Next, the packet forwarding processing performed by the HA 200 will be described. FIG. 7 is a flowchart showing an example of packet forwarding processing at the HA in the first embodiment of the present invention.

In FIG. 7, when the HA 200 intercepts a data packet (step S2101), it is checked whether a binding cache corresponding to the destination address of the data packet is held in the binding information holding section 208 (step S2102). If no binding cache corresponding to the destination address of the data packet is held in the binding information holding section 208, it is desired to perform processing for returning an ICMP message to the source of the packet, for example, without performing packet forwarding of this data packet (step S2110).

On the other hand, in step S2101, if a binding cache corresponding to the destination address of the data packet is held in the binding information holding section 208, it is then checked whether two or more CoAs are associated in the binding cache (step S2103). If two or more CoAs are associated in the binding cache, it means that two or more CoAs are associated with one common HoA in this binding cache. In this case, the HA 200 refers to the flow control information holding section 211 to check whether flow control information on this flow is registered (step S2104). If flow control information on this flow exists, the MN 100 selects the CoA specified in this flow control information as the forwarding destination (step S2105), while if no flow control information on this flow exists, it selects any one of the two or more CoAs associated in the binding cache as the forwarding destination (step S2106).

In step S2103, if only one CoA is associated in the binding cache, the HA 200 selects the associated CoA as the forwarding destination (step S2107). Note that this binding cache is registered, for example, when only one interface connected to the external network exists or when a specific CoA is associated with one dedicated HoA.

Then, the HA 200 generates an encapsulated packet using the selected CoA as the forwarding destination address in any processing step S2105, S2106, or S2107 (step S2108), and sends this packet to perform packet forwarding (step S2109).

Figure 8:
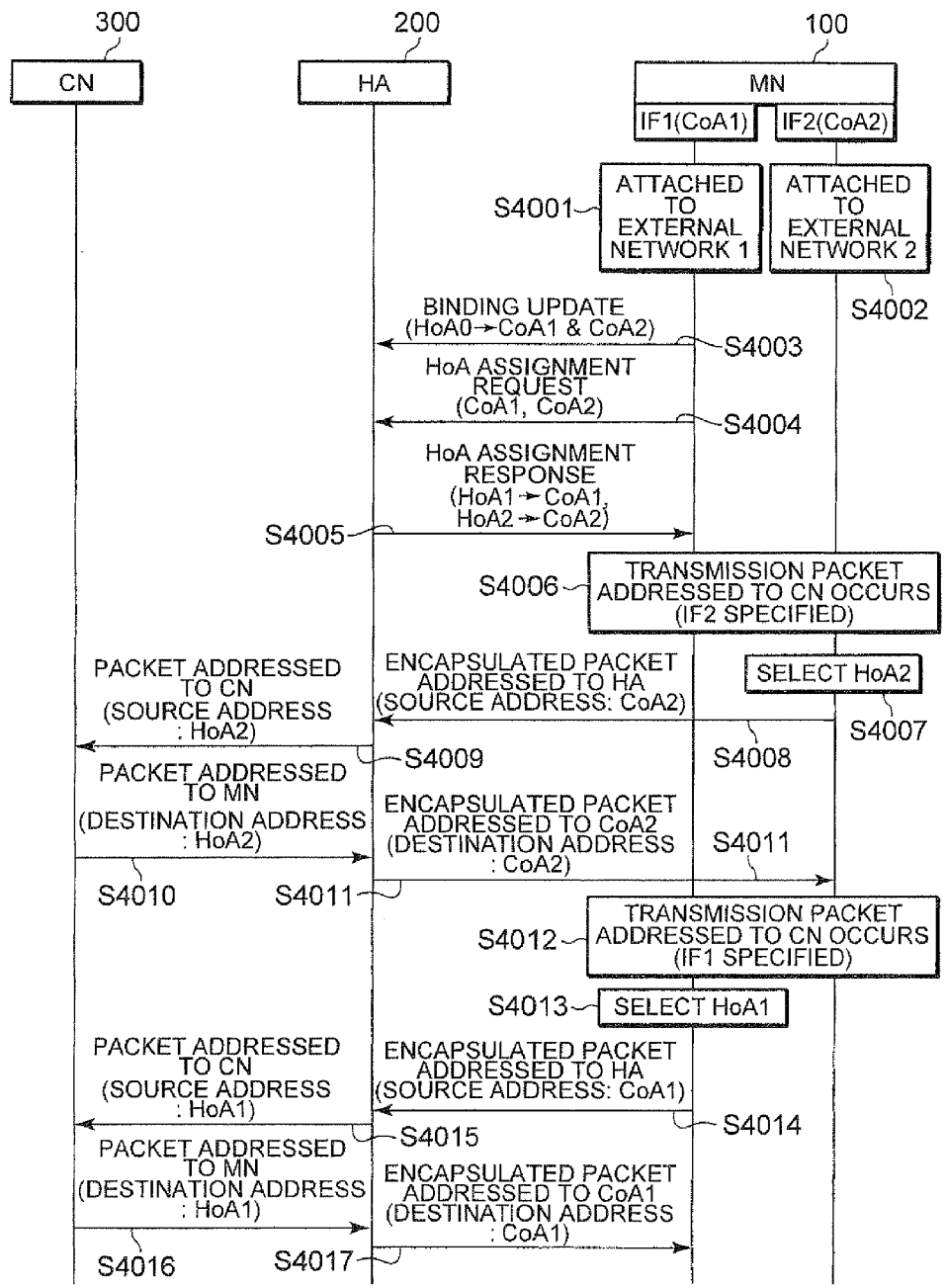
FIG. 8 It is a sequence chart showing an example in which the MN selects a dedicated HoA as a source address in the first embodiment of the present invention.

Next, packet transmission between the MN 100 and the CN 300 will be described. Referring first to FIG. 8, a flow of packets in a sequence chart showing an example in which the MN 100 selects the dedicated HoA as the source address will be described.

In FIG. 8, the MN 100 is attached to external network 1 and external network 2 via two interfaces (IF1 with CoA1 set and IF2 with CoA2 set), respectively (steps S4001 and S4002). Further, it is assumed that the MN 100 sends the HA 200 a binding update message for associating the common HoA (HoA0) with two CoAs, CoA1 and CoA2 (step S4003), and further sends the HA 200 a HoA assignment request message requesting the assignment of dedicated HoAs to IF1 (CoA1) and IF2 (CoA2), respectively (step S4004), and the HA 200 assigns dedicated HoAs, i.e., HoA1 to CoA1 and HoA2 to CoA2 (step S4005). The HoA assignment request in S4004 may be included in a BU message in S4003. If two or more CoAs cannot be registered at the same time through one BU message, a BU message for registering CoA1 is sent from IF1 and a BU message for registering CoA2 is sent from IF2. In this case, information for requesting the assignment of each dedicated HoA is included in each of the BU messages, respectively.

Here, when a transmission packet related to a flow specified to communicate with the CN 300 by using only IF2 occurs (step S4006), the MN 100 selects HoA2 as the dedicated HoA of IF2 for the source address of the transmission packet (step S4007), and further encapsulates the packet with CoA2 and sends it to the HA 200 (step S4008). The HA 200 decapsulates this packet and forwards it to the CN 300, so that the packet whose source address is HoA2 is delivered to the CN 300 (step S4009).

Further, HoA2 is set as the destination address of the packet sent from the CN 300 to the MN 100 (step S4010). After intercepting this packet, the HA 200 encapsulates the packet to be addressed to CoA2 corresponding to HoA2 and forwards the packet (step S4011).

The same processing is also performed in a case where a transmission packet related to a flow specified to communicate with the ON 300 by using only IF1. In other words, when a transmission packet related to a flow specified to communicate with the CN 300 by using only IF1 occurs (step S4012), the MN 100 selects HoA1 as the dedicated HoA of IF1 for the source address of the transmission packet (step S4013), and further encapsulates the packet with CoA1 and sends it to the HA 200 (step S4014). The HA 200 decapsulates this packet and forwards it to the CN 300, so that the packet whose source address is HoA1 is delivered to the CN 300 (step S4015).

Further, HoA1 is set as the destination address of the packet sent from the CN 300 to the MN 100 (step S4016). After intercepting this packet, the HA 200 encapsulates the packet to be addressed to CoA1 corresponding to HoA1 and forwards the packet (step S4017).

Figure 9:
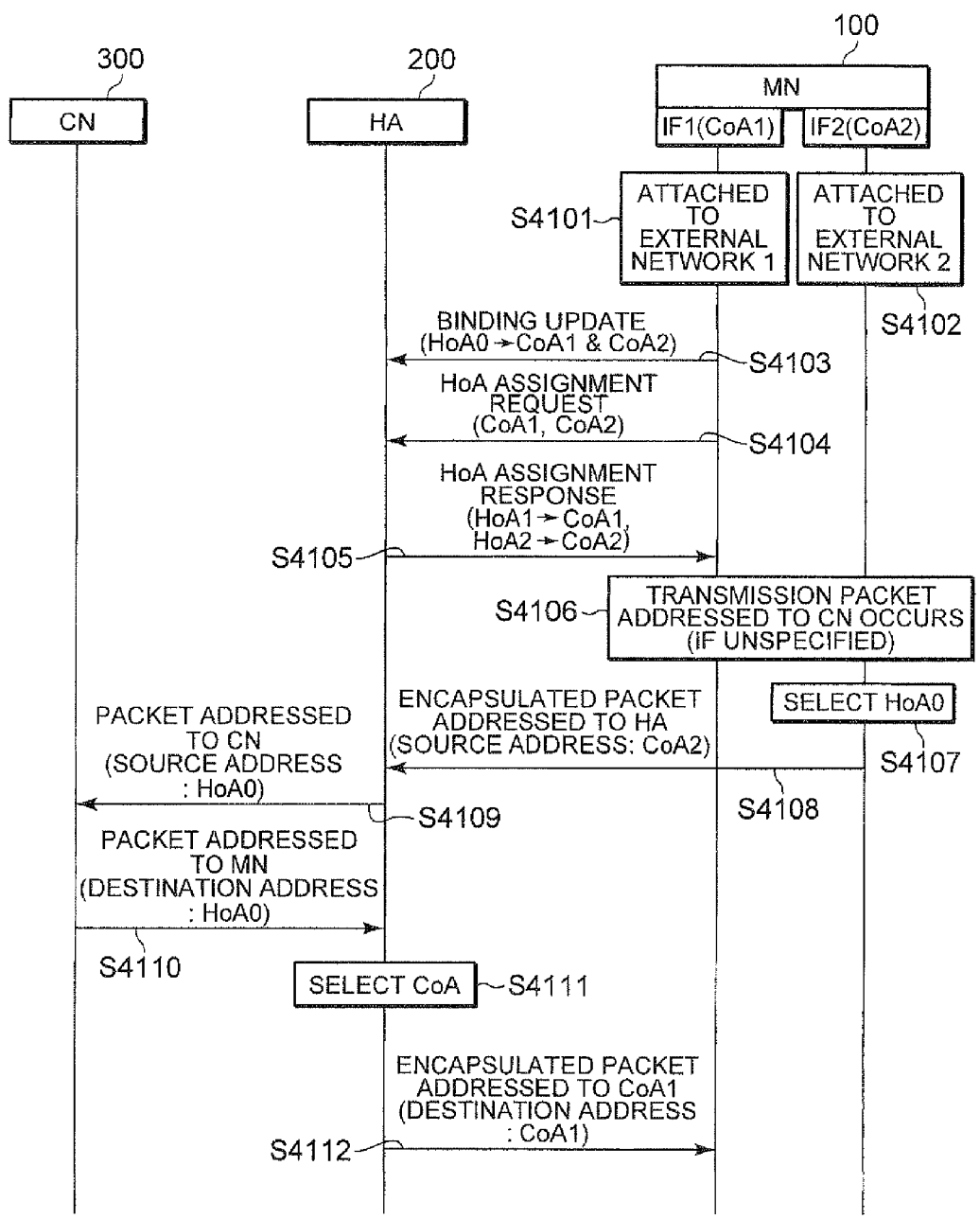
FIG. 9 It is a sequence chart showing an example in which the MN selects a common HoA as the source address in the first embodiment of the present invention.

Referring next to FIG. 9, a flow of packets when the MN 100 selects the common HoA as the source address will be described. FIG. 9 is a sequence chart showing an example in which the MN 100 selects the common HoA as the source address in the first embodiment of the present invention.

In FIG. 9, the MN 100 is attached to external network 1 and external network 2 via two interfaces (IF1 with CoA1 set and IF2 with CoA2 set), respectively (step S4101, S4102). Further, it is assumed that the MN 100 sends the HA 200 a binding update message for associating the common HoA (HoA0) with two CoAs, CoA1 and CoA2 (step S4103), and further sends the HA 200 a HoA assignment request message requesting the assignment of dedicated HoAs to IF1 (CoA1) and IF2 (CoA2), respectively (step S4104), and the HA 200 assigns dedicated HoAs, i.e., HoA1 to CoA1 and HoA2 to CoA2 (step S4105).

Here, when a transmission packet addressed to the CN 300 and related to a flow without specifying any interface occurs (step S4106), the MN 100 selects HoA0 as the common HoA for the source address of the transmission packet (step S4107), and further selects any interlace (e.g., IF2) as an interface used for packet transmission, encapsulates the packet with the CoA of the selected interface (here, CoA2 of IF2), and sends it to the HA 200 (step S4108). The HA 200 decapsulates this packet and forwards it to the CN 300, so that the packet whose source address is HoA0 is delivered to the CN 300 (step S4109).

Further, HoA0 is set as the destination address of the packet sent from the CN 300 to the MN 100 (step S4110). After intercepting this packet, the HA 200 selects either of CoA1 and CoA2 (e.g., CoA1) associated with HoA0 at its discretion (step S4111), encapsulates the packet to be addressed to the selected CoA1, and sends the packet (step S4112).

In the above-mentioned operation, the MN 100 selects IF2 as an interface from which the packet is sent, but HoA1 and CoA1 may be set as the source addresses of the packet to perform packet transmission via IF1. Further, the HA 200 may select either one of the two or more CoAs (CoA1 and CoA2) corresponding to the destination address (HoA0) of the packet sent from the CN. In the above-mentioned operation, CoA1 is selected, but CoA2 may also be selected. When flow control information is registered with the HA 200 or when a policy of the HA 200 exists, the forwarding destination is selected according thereto.

Thus, as discussed above, according to the first embodiment of the present invention, for each interface contained in the MN 100, the assignment of a dedicated HoA (or dedicated prefix) exclusively for the interface is requested of the HA. Since a CoA assigned to the interface is associated with the HoA in a one-to-one relationship, the MN 100 sends a packet using a dedicated HoA corresponding to the interface without registering flow control information with the HA 200 even if the packet to be sent is related to a flow specifying an interface, enabling the response packet to be forwarded only to the interface specified. Further, since the dedicated HoA exclusively for the interface is assigned only one CoA assigned to the interface, the HA 200 does not need to select a CoA to be used upon forwarding the packet to the MN 100.

Further, the MN 100 can register, with the HA, a common HoA (or common prefix) associated with two or more CoAs to use this common HoA in order to perform communication on a flow that does not particularly specify any interface. In the communication using this common HoA (or common prefix), when the HA 200 forwards a packet from the CN 300 to the MN 100, the HA 200 can make a determination based on any criteria (flow control information from the MN 100, a policy on the network side, etc.) to select a CoA as an appropriate forwarding destination.

Second Embodiment

A second embodiment of the present invention will next be described. The aforementioned first embodiment of the present invention is such that the HA 200 assigns a HoA exclusively for an interface and the MN 100 requests the HA 200 to assign the dedicated HoA. On the other hand, the second embodiment of the present invention is such that the MN 100 itself generates this dedicated HoA and notifies the HA of the dedicated CoA generated by the MN 100 itself using a BU message sent by the MN 100 upon registering a CoA of each interface.

In the second embodiment of the present invention, the basic network configuration is the same as that in FIG. 1 mentioned above, but the feature of the MN 100 (that the MN 100 itself generates a dedicated HoA) and the feature of the HA 200 (that it does not assign the dedicated HoA) are different from those in the first embodiment of the present invention.

Figure 15:
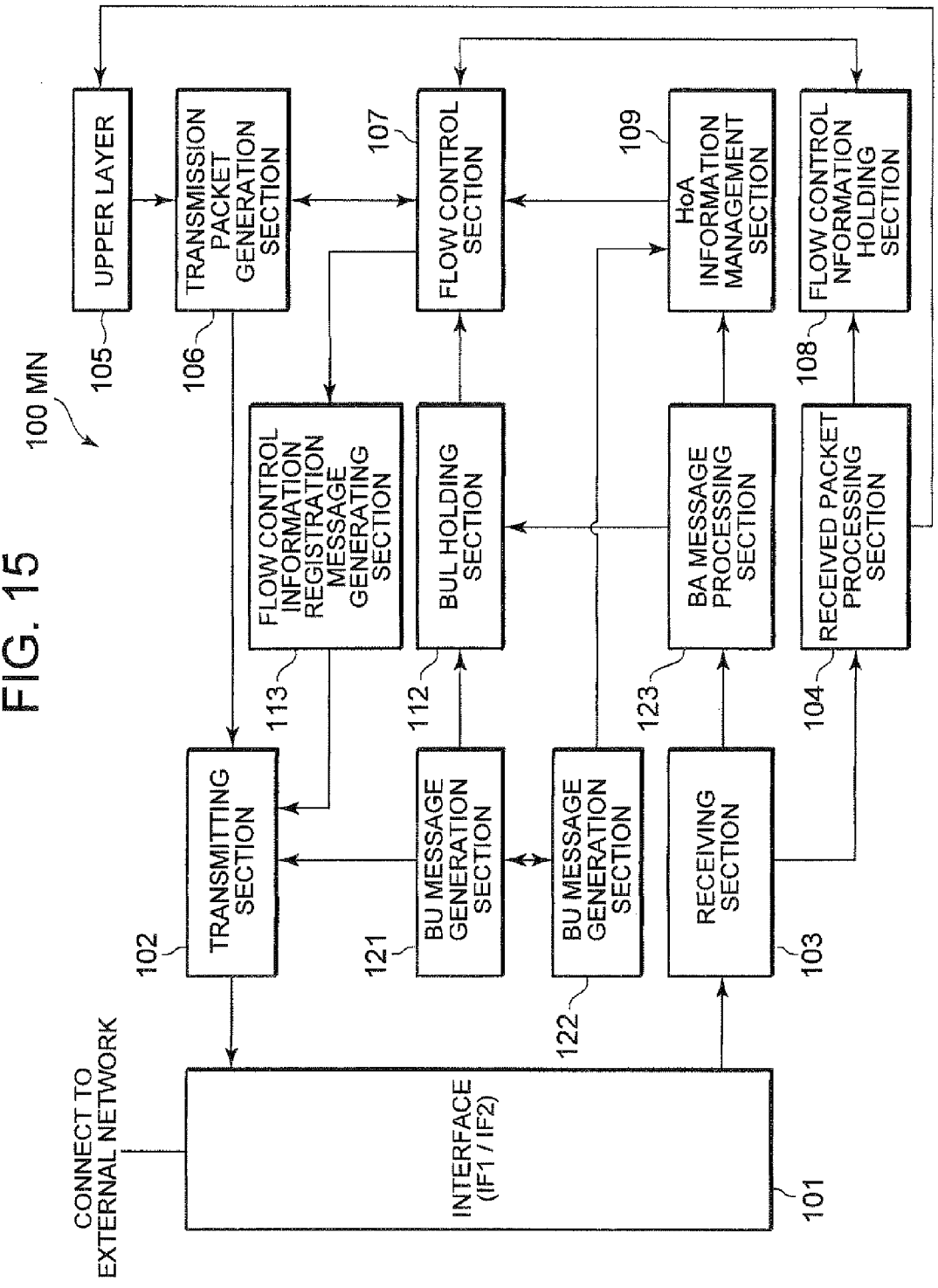
FIG. 15 It is a diagram showing an example of the configuration of a MN according to a second embodiment of the present invention.

Next, the configuration of the MN 100 in the second embodiment of the present invention will be described. FIG. 15 is a diagram showing an example of the configuration of a MN according to the second embodiment of the present invention. Although the configuration of the MN 100 shown in FIG. 15 is similar to the configuration of the MN 100 shown in FIG. 2, the second embodiment is different in that the MN has a BU message generation section 121 and a HoA generation section 122 instead of the HoA assignment request message generating section 110 of the MN 100 shown in FIG. 2, and a BA message processing section 123 instead of the HoA assignment notification message processing section 111 of the MN 100 shown in FIG. 2. In FIG. 15, functional blocks having the same functions as those shown in FIG. 2 are given the same reference numerals, and the description thereof will be omitted here.

The BU message generation section 121 has the function of generating a BU message for associating a CoA of an interface connected to an external network with a HoA, and also has the function of instructing the HoA generation section 122 to generate a dedicated HoA so that upon generating the BU message, the dedicated HoA will be assigned to the interface assigned the CoA. Further, it has the function of inserting the dedicated HoA in the BU message as a HoA corresponding to this CoA so that after acquiring each HoA exclusively for each interface from the HoA generation section 122, the association between the CoA assigned to the interface and the dedicated HoA acquired from the HoA generation section 122 will be registered with the HA 200.

The HoA generation section 122 has the function of generating a dedicated HoA to be set for the interface assigned the CoA. The dedicated HoA needs not to be the same value as any other HoA of the MN 100 itself and as the address of any other MN 100. This can be realized, for example, by predetermining a common rule (algorithm) for allowing each MN 100 to generate a dedicated HoA from a common HoA assigned to itself. When a prefix (home prefix) unique to the MN 100 is assigned, a new address is generated using the prefix. Though not shown, the MN 100 may give notice of the generated dedicated HoA in authentication processing performed upon attachment to an external network or through a message of IKEv2 executed with the HA 200. Further, the MN 100 can assign a dedicated HoA to either one of IF1 and IF2. For example, when IF1 of the MN 100 is connected to a home network (which may be a 3GPP network providing PMIP or GPRS tunneling protocol (GTP)) and the other IF2 is about to be newly connected to an external network (non-3GPP network), since the MN 100 can know its home prefix via IF1, the MN 100 can use the prefix to generate a dedicated HoA exclusively for IF2 and assign the dedicated HoA to IF2. Further, these common HoA and dedicated HoA, the associated CoAs are included in a BU message, and the BU message is sent to the HA 200. Further, as will be discussed later, information indicative of the common HoA or the dedicated HoA is added to the respective HoAs included in the BU message. Thus, the HA 200 receiving the BU message recognizes that a binding cache corresponding to both of IF1 connected to the home network of the MN and IF2 connected to the external network needs to be generated for the common HoA while generating, for the dedicated HoA, a binding cache associated with only the CoA included in the BU message. Here, for the common HoA, the HA 200 generates a binding cache including a HoA as a CoA as well as a binding cache associated with the CoA. The binding cache associated with the HoA as the CoA is handled as a binding cache indicative of the forwarding destination to IF1.

Note that the dedicated HoA can also be notified to the HA 200, an authentication server, or the like in authentication processing performed on IF2, through a message of IKEv2, or the like. In this case, the address used on the home network is handled as the common HoA. Therefore, a dedicated HoA may also be assigned to IF2 simultaneously with the assignment of the dedicated HoA to IF2.

The information indicative of the common HoA or the dedicated HoA is held in a binding cache generated by the HA 200. This information is also used when the MN 100 registers flow control information with the HA 200, so that the HA 200 can determine that the HoA to which the notified flow control information is applied is a HoA to which information indicative of the common HoA is added, and not to applied to the dedicated HoA.

On the other hand, the MN 100 may handle, as the dedicated HoA, the address already used on IF1 connected to the home network, and assign both the common HoA and the dedicated HoA to IF2 connected to the external network. In this case, a packet delivered to the common HoA is forwarded to both IF1 and IF2, and a packet delivered to the address already assigned to IF1 is not forwarded to IF2. The MN 100 can arbitrarily determine whether to handle the already used address as the common HoA or the dedicated HoA. However, when communication on IF1 being performed when IF2 is connected to the external network is only a flow desired to use IF1, the determination may be made to handle the address of IF1 as the dedicated HoA and assign a common HoA and a dedicated HoA to IF2 separately. Further, if there is only a flow that should only use IF1 in communication on IF1 when IF2 is not connected to the external network yet, handling the address of IF1 as the dedicated HoA can be selected as mentioned above. If there is a flow that can use both IF1 and IF2 in communication on IF1, a common HoA will be newly generated and assigned to IF1. In this case, when IF2 is connected to the external network, the MN 100 determines to use the address, used as the common HoA on IF1, as the common HoA for IF2 as well. Simultaneously, the MN 100 determines the assignment of a dedicated HoA to IF2.

When the prefix assigned by the HA to the MN is a prefix exclusively for IF1, the MN 100 requests the assignment of a different prefix to IF2 as a common prefix, and further requests the assignment of a prefix exclusively for IF2 in the same manner as in the first embodiment of the present invention.

In addition, information explicitly indicating whether a prefix assigned upon assignment of the prefix to IF1 connected to the home network is the dedicated prefix or the common prefix may be added to assign the prefix to the MN 100. In this case, if the prefix assigned to IF1 is the dedicated prefix, the MN 100 can become aware that packets delivered to the address of IF1 are not forwarded to IF2 when IF2 is connected to the external network. Then, when the MN 100 wants to use both interfaces as forwarding destinations as well as the dedicated prefix, the MN 100 can also request the assignment of a common prefix separately. On the other hand, if the prefix assigned to IF1 is the common prefix, the MN 100 also uses the address assigned to IF1 or the address separately generated as the common HoA for the IF2 when IF2 is connected to the external network while requesting the assignment of a dedicated prefix to IF2 separately.

The BA message processing section 123 has the function of processing a BA message sent from the HA 200 as a response to the BU message sent from the BU message generation section 121. Status information indicative of the registration result of binding information on the dedicated HoA exclusively for the interface and the CoA is described in the BA message. When this status information indicates successful registration, the registration result of the binding information is recorded in the BUL holding section 112 while registering, with the HoA information management section 109, information indicating that the dedicated HoA is assigned to the CoA (or BID) of the interface.

Figure 19:
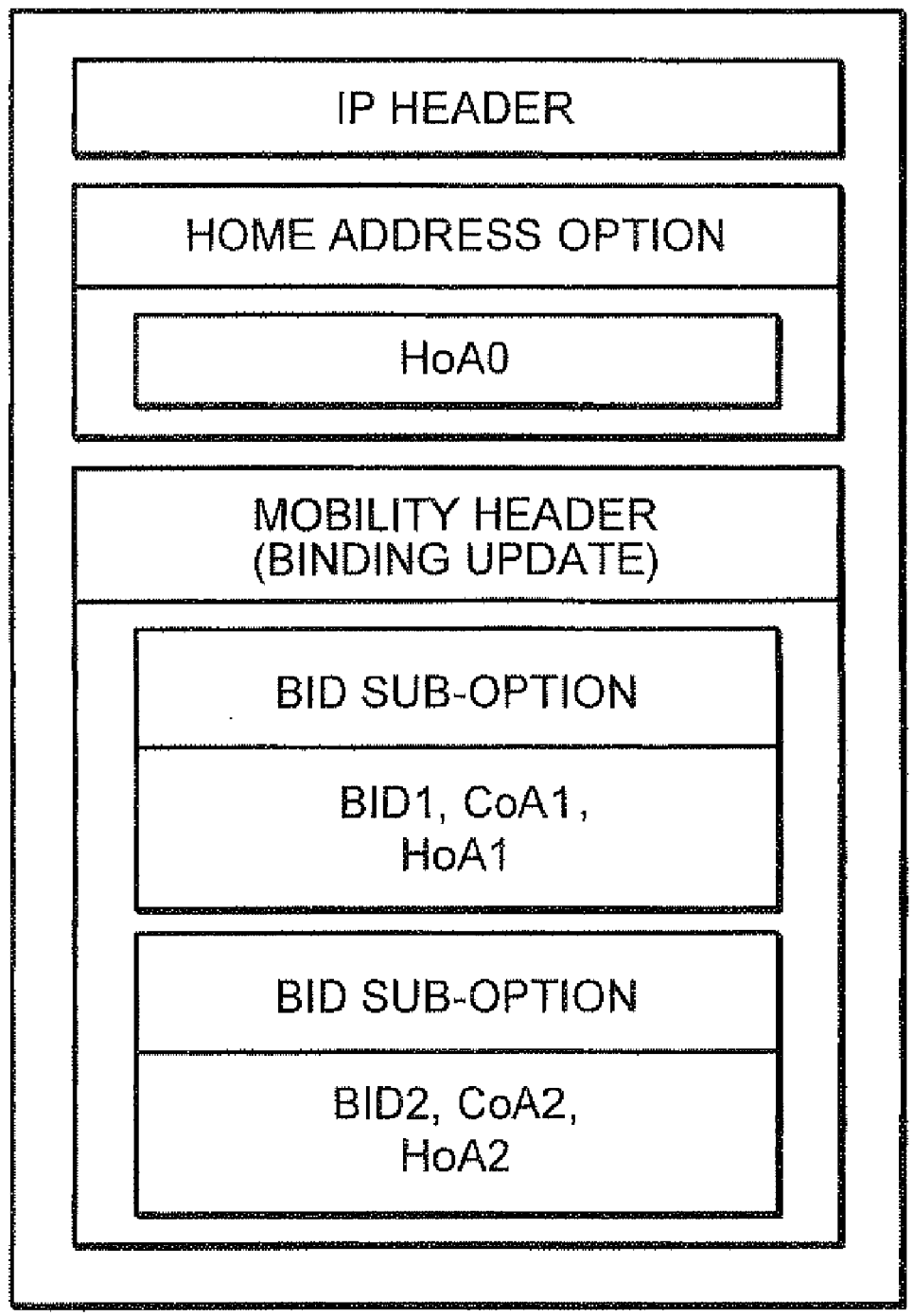
FIG. 19 It is a diagram showing an example of a BU message sent from the MN to the HA in the second embodiment of the present invention.

For the above-mentioned BU message generated in the BU message generation section 121, for example, a format as shown in FIG. 19 to be described below can be used. The BU message generated in the BU message generation section 121 is sent from the MN 100 to the HA 200, and processed in a BU message processing section 221 (to be described later) of the HA 200.

FIG. 19 is a diagram showing an example of the BU message sent from MN to HA in the second embodiment of the present invention. Shown in FIG. 19 is a structure example of the BU message. The dedicated HoA generated by the HoA generation section 122 is inserted into a BID sub-option inside the BU message together with a CoA and a BID for specifying the CoA. As shown in FIG. 19, the dedicated HoA (HoA1) generated for IF1 is included in a BID sub-option including CoA1 and BID1, and the dedicated HoA (HoA2) generated for IF2 is included in a BID sub-option including CoA2 and BID2.

Two or more BID sub-options are inserted in one BU message and sent so that not only dedicated HoAs respectively for two or more interfaces (IF1 and IF2) can be registered, but also association between CoAs (CoA1 and CoA2) respectively associated with the two or more interfaces (IF1 and IF2) and the common HoA (HoA0) can be registered through transmission of one BU message. Further, if the common HoA of the MN 100 is not assigned yet, the MN 100 may generate a common HoA in the HoA generation section 122 and register the generated common HoA at the same time using the above BU message. Further, the dedicated HoA may be sent by including it in an option (e.g., a home address option) normally including a HoA together with the common HoA, rather than in the BID option. In this case, information indicating whether each HoA is the common HoA or the dedicated HoA is added. The addition of this information enables the HA 200 to know that all CoAs included in the BU message are associated with the common HoA and that either one of CoAs included in the BU message is associated with the dedicated HoA. The determination as to which CoA is associated with the dedicated HoA is made, for example, in the order of HoAs and CoAs included in the BU message so that it can be determined that the first CoA is associated with the first dedicated HoA and the second CoA is associated with the second dedicated HoA. Alternatively, numeric values may be included in an option including dedicated HoAs and an option including CoAs to associate HoAs and CoAs having the same values, respectively. BIDs may be used as the numeric values.

When the two or more CoAs cannot be registered through one BU message, a BU message registering CoA1 is sent from IF1 and a BU message registering CoA2 is sent from IF2. Even in this case, a common HoA, a dedicated HoA and a CoA are included in each BU message, and information indicative of the common HoA or the dedicated HoA is added to each HoA.

Figure 20:
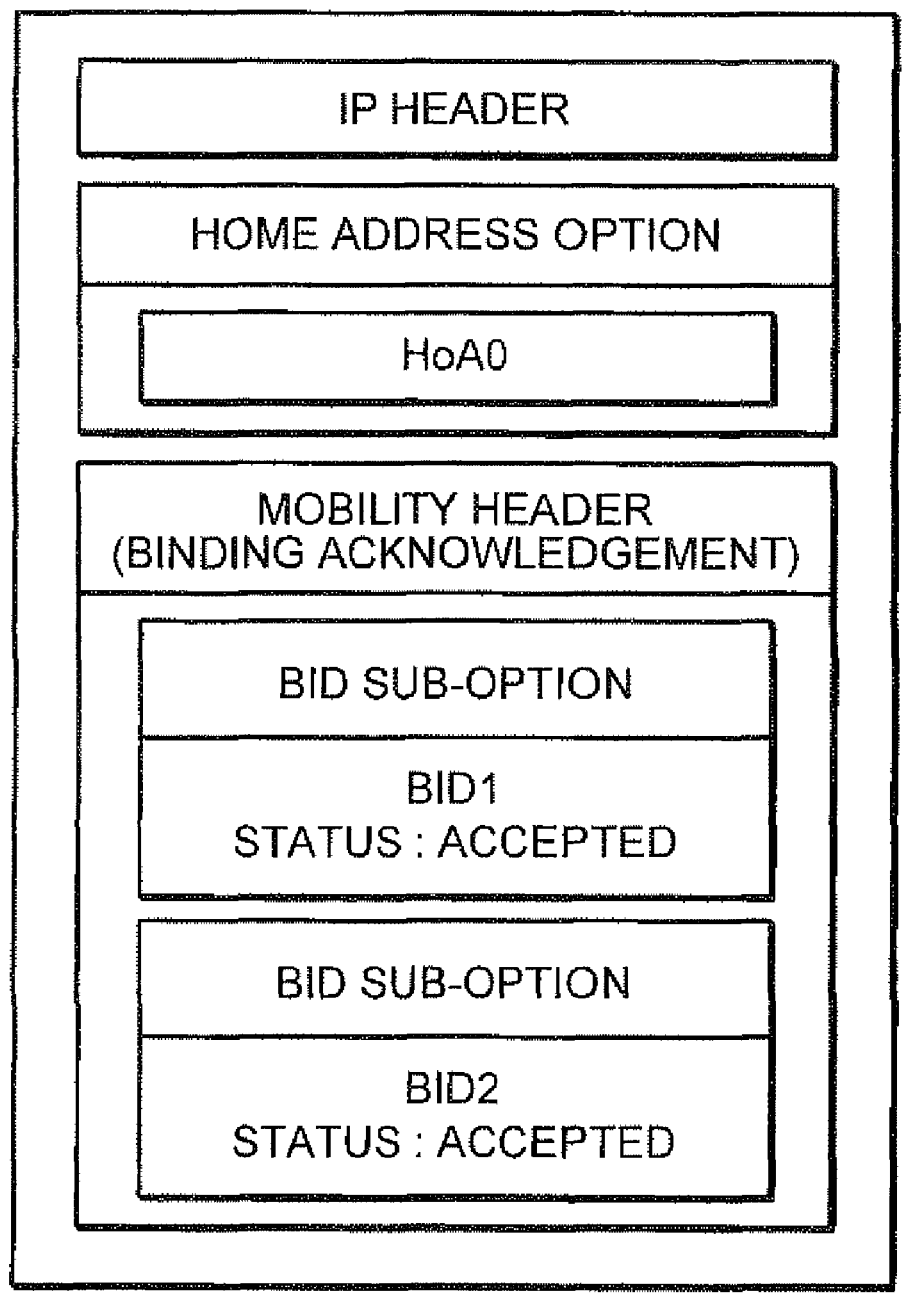
FIG. 20 It is a diagram showing an example of a BA message sent from the HA to the MN in the second embodiment of the present invention.

For the BA message processed in the above-mentioned BA message processing section 123, for example, a format as shown in FIG. 20 to be described below can be used. The BA message processed in the BA message processing section 123 is generated in a BA message generating section 222 (to be described later) of the HA 200 and sent from the HA 200 to the MN 100.

FIG. 20 is a diagram showing an example of the BA message sent from the HA to the MN in the second embodiment of the present invention. Shown in FIG. 20 is a structure example of the BA message. Note that the BA message of FIG. 20 is a response message to the BU message of FIG. 19.

In BID sub-options of the BA message of FIG. 20, status indicative of the registration result of binding information sent through the BU message is included, and from the status value, it can be figured out whether the registration of the dedicated HoA and association of a CoA with the HoA is successful or not (accepted or not). If the registration of the dedicated HoA for an interface is successful, the BA message processing section 123 instructs the HoA information management section 109 to hold a dedicated HoA assigned to each interface and information on CoA corresponding to the dedicated HoA. As a result, for example, information indicating that HoA1 and CoA1 are associated with IF1 and information indicating that HoA2 and CoA2 are associated with IF2 are held in the HoA information holding section 109 as the dedicated HoA and the CoA associated with each interface.

In the BA message of FIG. 20, BID1 as information for specifying CoA1 is included in the first BID sub-option and a value (accepted) indicative of successful registration is included as the status. Thus, it is shown that the registration of a binding cache in which CoA1 is associated with HoA1 is successful in addition to the association of CoA1 with HoA0. Similarly, the second BID sub-option also shows that the registration of a binding cache in which CoA2 is associated with HoA2 is successful in addition to the association of CoA2 with HoA0. The CoA may be used intact instead of the BID. The status of the registration result may be such that the status related to the registration of CoA1 and CoA2 for HoA0 and the status related to the registration of a CoA for a dedicated HoA of each interface (association between HoA1 or CoA1 and association between HoA2 and CoA2) are shown separately.

Figure 16:
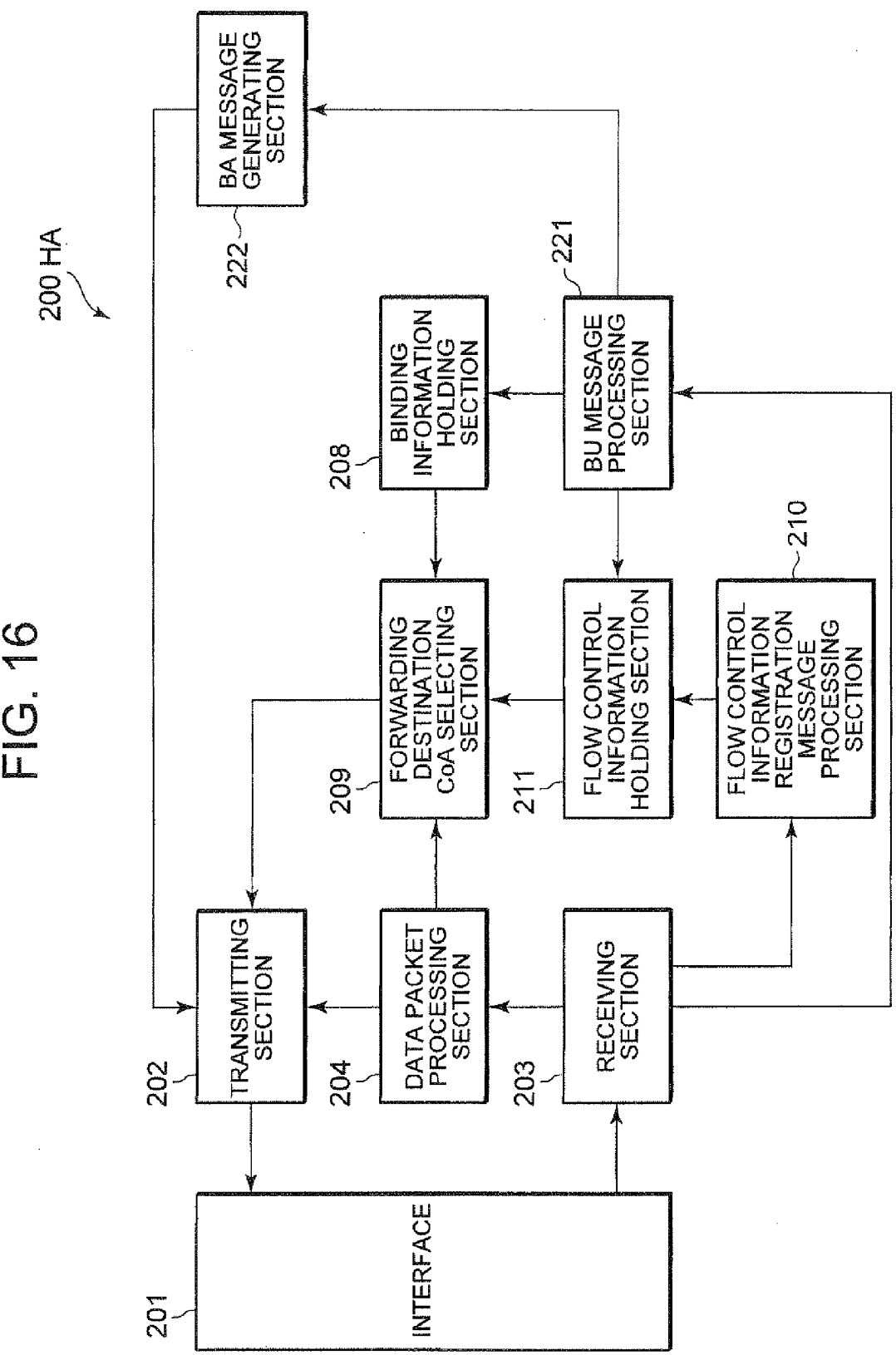
FIG. 16 It is a diagram showing an example of the configuration of a HA according to the second embodiment of the present invention.

Next, the configuration of the HA 200 according to the second embodiment of the present invention will be described. FIG. 16 is a diagram showing an example of the configuration of a HA according to the second embodiment of the present invention. Although the configuration of the HA 200 shown in FIG. 16 is similar to the configuration of the HA 200 shown in FIG. 16, the second embodiment is different in that the HA has the BU message processing section 221 instead of the HoA assignment request message processing section 205 of the HA 200 shown in FIG. 3, and a BA message generating section 222 instead of the HoA assignment notification message generating section 207 of the HA 200 shown in FIG. 3. Further, the HA 200 does not have the HoA assignment section 206 shown in FIG. 16. In FIG. 16, functional blocks having the same functions as those shown in FIG. 3 are given the same reference numerals, and the description thereof will be omitted here.

The BU message processing section 221 has the function of performing processing on the BU message received from the MN 100. The BU message processing section 221 acquires, from the BU message, a CoA registered for a common HoA and a dedicated HoA (dedicated HoA generated by the MN 100 itself) assigned to the CoA, passes these pieces of information as binding information on the MN 100 to the binding information holding section 208, and causes it to manage the binding information. This registration results in registering binding information as shown in FIG. 14 in the same manner as in the first embodiment of the present invention.

The BA message generating section 222 has the function of generating a BA message in accordance with an instruction from the BU message processing section 221 to give notice of the results of the registration of a CoA for a common HoA and the registration of a CoA for a dedicated HoA.

Figure 17:
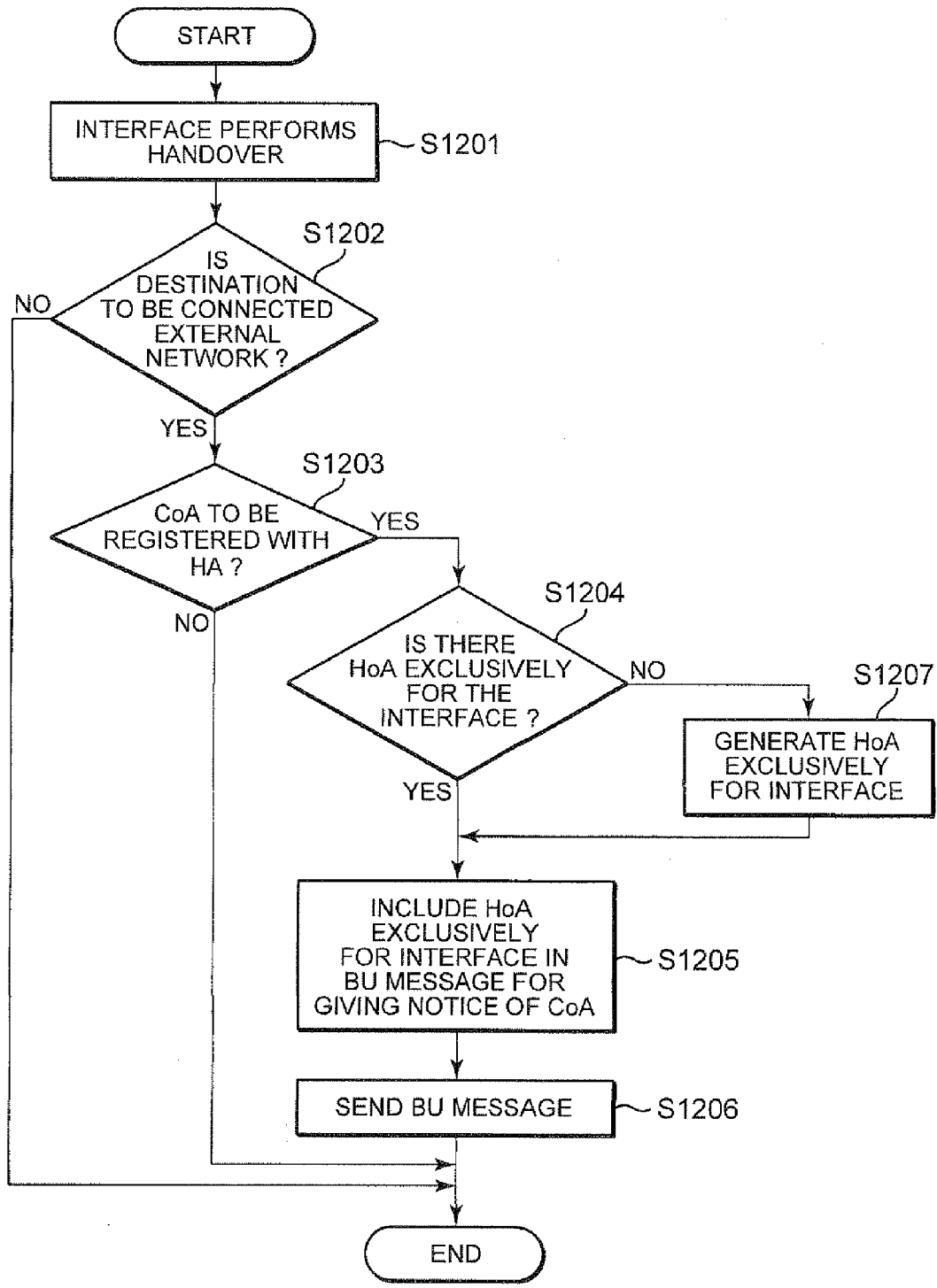
FIG. 17 It is a flowchart showing an example of the operation of the MN in the second embodiment of the present invention.

Next, the operation of the MN in the second embodiment of the present invention will be described. FIG. 17 is a flowchart showing an example of the operation of the MN in the second embodiment of the present invention.

In FIG. 17, when an interface performs a handover (step S1201), the MN 100 determines whether a new destination to be connected by the handover is an external network (step S1202). If the new destination is an external network (i.e., a network other than the home network), it is then decided whether to register a CoA with the HA 200 (step S1203). If a CoA is registered with the HA 200, the MN 100 checks whether a HoA exclusively for the interface (dedicated HoA assigned to the interface that performed the handover) has already been assigned (step S1204).

If the HoA exclusively for the interface that newly performed the handover to the external network already exists for example, when the interface was connected to another external network before the handover), the MN 100 performs processing for including the dedicated HoA of the interface in a BU message for giving notice of a CoA newly acquired on the external network after the handover (step S1205), and sends this BU message (step S1206).

On the other hand, in step S1204, if the HoA exclusively for the interface that newly performed the handover to the external network does not exist for example, when it was connected to the home network before the handover), the MN 100 generates, in the HoA generation section 122, a dedicated HoA assigned only to the interface (step S1207). Then, the MN 100 performs processing for including the dedicated HoA of the interface, generated in the HoA generation section 122 in the BU message for giving notice of a CoA newly acquired from the external network after the handover (step S1205), and sends this BU message (step S1206).

In the above-mentioned operation shown in FIG. 17, a HoA exclusively for each interface is assigned immediately after the handover, but the timing of assigning a HoA exclusively for each interface is optional. For example, when determining that it is desired to assign a HoA exclusively for each interface, a HoA assignment request message may be sent. When a flow desired to be sent and received by specifying an interface exists, it is desired to set and register the dedicated HoA before sending and receiving the flow so that communication of the flow will be performed using only the specific interface.

Figure 18:
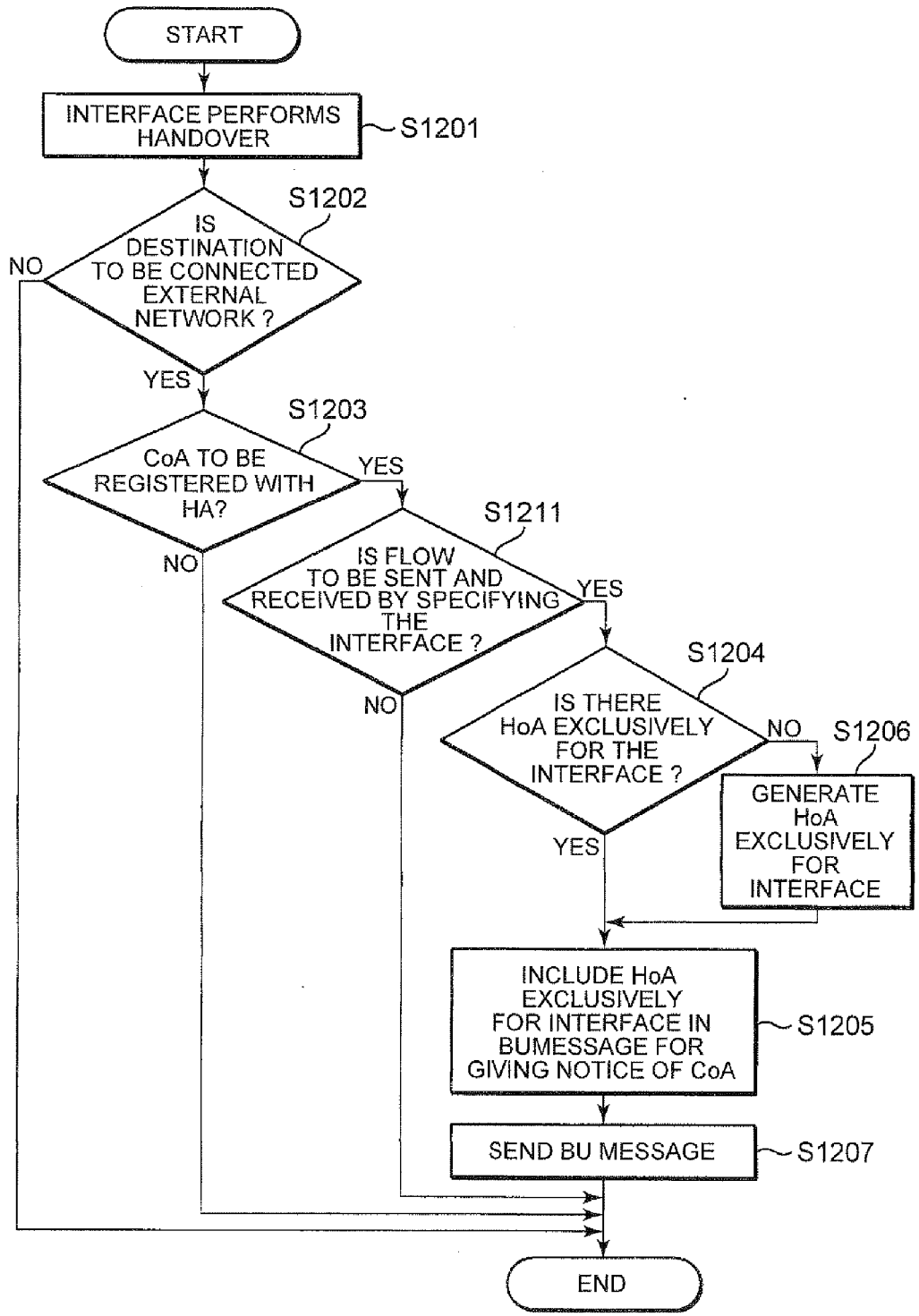
FIG. 18 It is a flowchart showing another example of the operation of the MN in the second embodiment of the present invention.

Further, for example, even if the new destination after the handover is an external network, it is determined as shown in FIG. 18 whether a flow desired to be sent and received only via the interface that performed the handover exists (i.e., whether there is a flow sent and received by specifying the interface (step S1211). If a flow desired to be sent and received only via the interface that performed the handover exists, the HoA exclusively for the interface is set, while if there is no flow desired to be sent and received only via the interface that performed the handover exists, the HoA exclusively for the interface is not set. In this case, the HoA exclusively for the interface may be set at any other timing.

In the second embodiment of the present invention, data transmission processing performed by the MN 100 or packet forwarding processing performed by the HA 200 are performed by the same operation (e.g., the operation in FIG. 6 or FIG. 7) as in the first embodiment of the present invention.

Thus, as discussed above, according to the second embodiment of the present invention, the MN 100 itself generates a HoA exclusively for an interface, and associates a CoA assigned to the interface with the dedicated HoA in a one-to-one manner. Therefore, even if a packet to be sent is related to a flow specifying an interface, the MN 100 sends the packet using a dedicated HoA corresponding to the interface without registering flow control information with the HA 200, enabling the response packet to be forwarded only to the interface specified. Further, since the HoA exclusively for the interface is assigned only one CoA assigned to the interface, the HA 200 does not need to select a CoA to be used upon forwarding the packet to the MN 100.

Further, the MN 100 can register, with the HA, a common HoA associated with two or more CoAs to use this common HoA in order to perform communication on a flow that does not particularly specify any interface. In the communication using this common HoA, when the HA 200 forwards a packet from the CN 300 to the MN 100, the HA 200 can select a CoA as the forwarding destination at its discretion.

Third Embodiment

Figure 21:
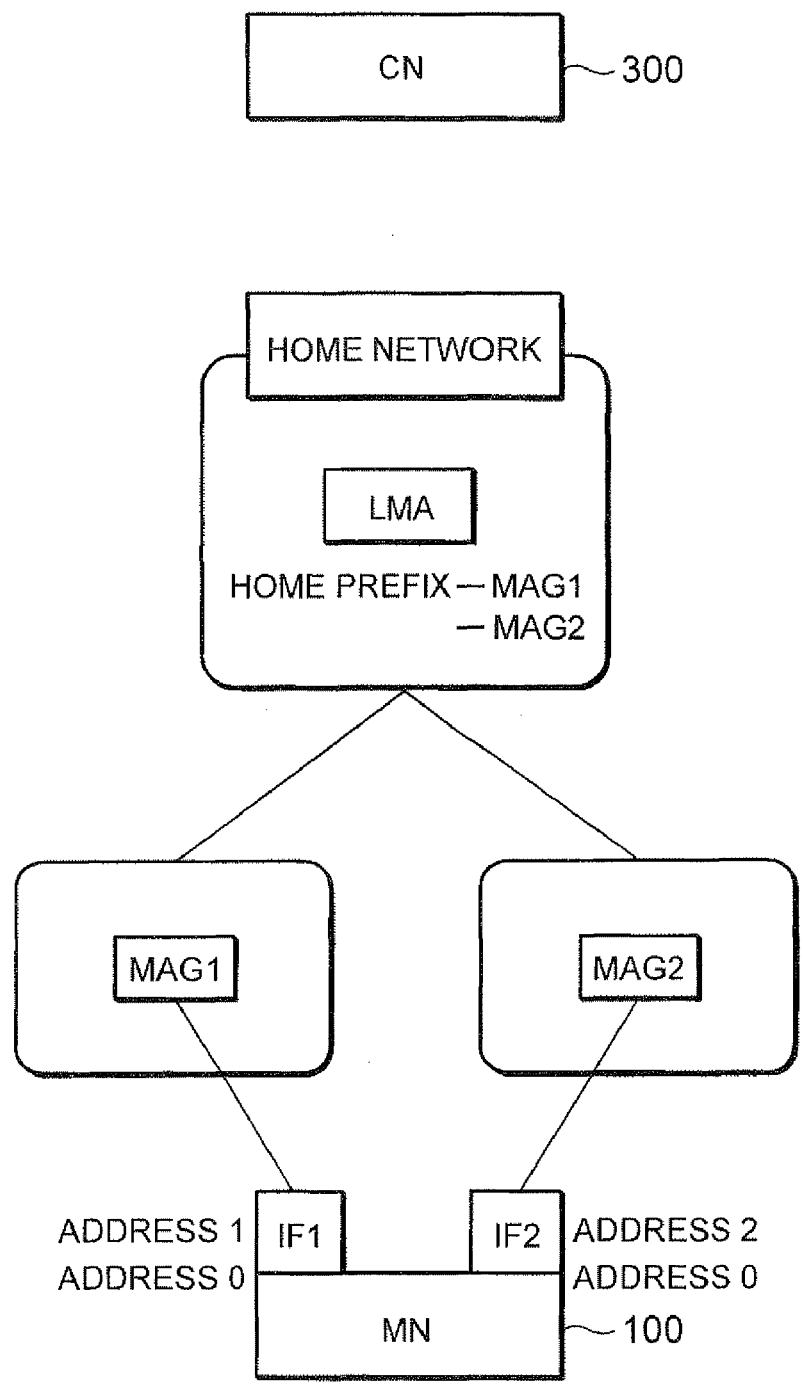
FIG. 21 It is a diagram showing the structure of a network according to a third embodiment of the present invention.

Next, a third embodiment of the present invention will be described. FIG. 21 is a diagram showing the structure of a network according to the third embodiment of the present invention. In FIG. 21, the MN 100 has two interfaces (IF1 and IF2), where IF1 is connected to MAG 1 and assigned address 1, and IF2 is connected to MAG 2 and assigned address 2. The addresses of the MAG 1 and the MAG 2 are associated with a home prefix of the MN 100, and registered with a LMA.

When the two interfaces of the MN 100 are attached to the same PMIP domain and the same home prefix is advertised from both networks to which the two interfaces are connected, respectively, addresses exclusively for the respective interfaces (corresponding to dedicated HoAs) an address common to the interfaces can be used in the same manner as in the aforementioned first and second embodiments of the present invention.

The address of each MAG as a CoA for the home prefix is registered with the LMA through a proxy BU message sent by the MAG to the LMA. However, the LMA does not understand what kind of address is actually assigned to each interface of the MN 100. Therefore, the LMA tries to send any address generated from the home prefix of the MN 100 without specifying the MAG 1 and MAG 2. This operation has no problem with the common address of the MN 100, but there is a possibility that packets are not forwarded to the dedicated address of a corresponding interface.

Therefore, the MN 100 sends the MAG an NA (Neighbor Advertisement) message including the dedicated address, and requests the MAG to send the LMA a PBU message for associating the dedicated address with the address of the MAG. Information (set a flag) indicating that the dedicated address is included may be included in the NA message for giving notice of the dedicated address, and an NS message, a BU message, or the like may be used instead of the NA message. Further, the notification may be sent in layer 3 connection processing or authentication processing performed upon attachment to the network, or in IKEv2 executed with the MAG. Upon receipt of the request, the MAG notifies the LMA of the notified address of the MN 100 as a dedicated address of an interface through which the MN 100 is connected to the MAG, and sends a proxy BU message to request the LMA to register a binding cache in which the dedicated address is associated with the address of the MAG. Information (set a flag) indicating that the dedicated address is included may be included in the proxy BU message. The LMA generates a binding cache (e.g., including binding in which address 1 is associated with the address of the MAG 1 or binding in which address 2 is associated with the address of the MAG 2) in which the address of the MAG is associated with the notified address exclusively for the interface of the MN 100. As shown in the first and second embodiments of the present invention, the MN 100 itself may generate the dedicated address used by the MN 100 or request a DHCP server or AAA server, the HA 200 or the LMA to assign the dedicated address.

Thus, when receiving a packet addressed to an address using the home prefix of the MN 100, the LMA can forward the packet to the address of the MAG associated to the address if the address is the dedicated address. When an address is assigned to the MN 100 using DHCP or AAA, or IKE or IKEv2, it is desired to notify the MN 100 of information indicating whether the assigned address is the common address or the dedicated address.

Thus, as discussed above, according to the third embodiment of the present invention, the MN 100 having two or more interfaces sends a packet using an address corresponding to the interface without sending flow control information to a PMIP domain even in a state where the two or more interfaces are attached to the same PMIP domain, enabling the response packet to be forwarded only to the interface specified. Further, since only one address of the MAG assigned to the interface is associated with the dedicated address exclusively for the interface, the LMA does not need to perform processing for selecting the MAG for a forwarding destination upon forwarding a packet to the MN 100. Note that IF1 and IF2 are not necessarily attached to the PMIP domain at the same time, and when a flow desired to switch the forwarding destination and a flow unnecessary to switch the forwarding destination exist, the assignment and use of a dedicated HoA described in this embodiment is possible even if only either one is attached to the PMIP domain and the other is attached using GPRS tunneling Protocol (GTP) or mobile IP. In other words, the method described in the first and second embodiments of the present invention and the method described in the third embodiment of the present invention can be used in combination. In this case, the method to be used is selected depending on which of CMIP and PMIP the interface (IF1, IF2) of the MN 100 is using.

Further, the MN 100 can use a common address to perform communication on a flow without particularly specifying any interface. In the communication using this common address, the LAM can select the MAG as the forwarding destination at its discretion upon forwarding a packet from the CN 300 to the MN 100.

In step S1002 of FIG. 4 and FIG. 5 or step S1202 of FIG. 17 and FIG. 18, although it is determined whether the destination to which the interface that performed a handover is connected is an external network, it may be determined whether two or more interfaces are connected to an external network as a result of handover via the interface, for example, to decide whether to set and register a dedicated HoA depending on the determination result. In this case, the present invention has a higher effect. In the third embodiment of the present invention, it may also be determined whether connection destinations of two or more interfaces are connected to different MAGs belonging to the same PMIP domain to decide whether to set and register a dedicated HoA depending to the determination result.

Each of the functional blocks used in describing the aforementioned embodiments of the present invention is implemented as an LSI (Large Scale Integration) typified by an integrated circuit. These may be made up of one chip individually, or they may be made up of one chip to include some or all of them. Here, although the LSI is assumed, it may be called an IC (Integrated Circuit), a system LSI, a super LSI, or an ultra LSI depending on the degree of integration.

Further, the technique for creation of an integrated circuit is not limited to LSI, and it may be implemented by a dedicated circuit or a general-purpose processor. An FPGA (Field Programmable Gate Array) capable of programming after LSI manufacturing or a reconfigurable processor capable of reconfiguring connections or settings of circuit cells within the LSI may also be employed.

In addition, if integrated circuit technology capable of replacing LSI emerges with the development of semiconductor technology or another technology derived therefrom, the technology may, of course, be used to integrate the functional blocks. For example, applications of biotechnology may be possible.

INDUSTRIAL APPLICABILITY

The present invention eliminates the need for a mobile terminal to register flow control information with a HA, enabling reduction in processing load accompanied by the registration of the flow control information and reduction in traffic of signaling for the registration, and is applicable to a communication technique for packet communication performed by a mobile terminal using a wireless communication function while moving, a communication technique for a mobile terminal having two or more radio communication interfaces, and the like.

The invention claimed is:

1. A mobile terminal capable of attaching to a network to perform packet communication, comprising:

a plurality of radio communication interfaces;

an address holding unit configured to hold a common address assigned to the plurality of radio communication interfaces in common and a dedicated address assigned individually to each of the plurality of radio communication interfaces;

a binding registration processing unit configured to process first binding information indicative of a correspondence relationship between the mobile terminal and the common address and second binding information indicative of a correspondence relationship between each of the plurality of radio communication interfaces and the dedicated address assigned to each of the plurality of radio communication interfaces in such a manner to be registered with a network node for performing forwarding processing on a packet addressed to the mobile terminal; and an address setting unit configured to determine whether, upon transmission of a packet, the packet is a packet belonging to a flow necessary to be sent and received by using only a specific interface among the plurality of radio communication interfaces, and if determining that the packet is not a packet belonging to a flow necessary to be sent and received by using only the specific interface, using the common address as a source address of the packet.

2. A method to be performed by a mobile terminal capable of attaching to a network to perform packet communication, the mobile terminal including a plurality of radio communication interfaces and an address holding unit configured to hold a common address assigned to the plurality of radio communication interfaces in common and a dedicated address assigned individually to each of the plurality of radio communication interfaces, the method comprising the steps of:

processing first binding information indicative of a correspondence relationship between the mobile terminal and the common address and second binding information indicative of a correspondence relationship between each of the plurality of radio communication interfaces and the dedicated address assigned to each of the plurality of radio communication interfaces in such a manner to be registered with a network node for performing forwarding processing on a packet addressed to the mobile terminal; and determining whether, upon transmission of a packet, the packet is a packet belonging to a flow necessary to be sent and received by using only a specific interface among the plurality of radio communication interfaces, and if determining that the packet is not a packet belonging to a flow necessary to be sent and received by using only the specific interface, using the common address as a source address of the packet.

* * * * *